(12) United States Patent
Aronov et al.

(10) Patent No.: US 10,678,580 B2
(45) Date of Patent: Jun. 9, 2020

(54) METHODS AND APPARATUS TO PUBLISH INTERNAL COMMANDS AS AN APPLICATION PROGRAMMING INTERFACE IN A CLOUD INFRASTRUCTURE

(71) Applicant: VMware, Inc., Palo Alto, CA (US)

(72) Inventors: Evgeny Aronov, Sofia (BG); Miroslav Mitevski, Sofia (BG); Diana Kovacheva, Sofia (BG); Ivo Petkov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 59 days.

(21) Appl. No.: 15/590,686

(22) Filed: May 9, 2017

(65) Prior Publication Data

US 2018/0329733 A1 Nov. 15, 2018

(51) Int. Cl.
| | |
|---|---|
| *G06F 9/455* | (2018.01) |
| *G06F 9/50* | (2006.01) |
| *G06F 9/48* | (2006.01) |
| *G06F 9/445* | (2018.01) |
| *G06F 8/60* | (2018.01) |

(52) U.S. Cl.
CPC ........... *G06F 9/45558* (2013.01); *G06F 8/60* (2013.01); *G06F 9/44505* (2013.01); *G06F 9/4843* (2013.01); *G06F 9/5027* (2013.01); *G06F 9/5077* (2013.01); *G06F 2009/45562* (2013.01); *G06F 2009/45587* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 9,864,874 B1 * | 1/2018 | Shanbhag | G06F 21/6218 |
| 2017/0034198 A1 * | 2/2017 | Powers | G06F 21/552 |
| 2017/0161059 A1 * | 6/2017 | Wood | G06F 9/45558 |

* cited by examiner

*Primary Examiner* — Charlie Sun
(74) *Attorney, Agent, or Firm* — Hanley, Flight and Zimmerman, LLC

(57) ABSTRACT

Methods and apparatus to publish internal commands as a programming interface in a cloud infrastructure are provided. An example apparatus includes a first virtual appliance including a management endpoint to coordinate task execution in a computing platform. The example apparatus includes a computing infrastructure interface including a programming interface, the programming interface to expose a subset of commands for the computing platform and to hide a remainder of the commands of the computing platform from a requester, the requester to execute a first command from the subset of commands via the programming interface. The management endpoint is to parse a first execution task generated from selection of the first command via the programming interface to determine a component of the computing platform to execute the first command associated with the first execution task and to route the first command from the first execution task to the component for execution.

20 Claims, 16 Drawing Sheets

METHODS AND APPARATUS TO PUBLISH INTERNAL COMMANDS AS AN APPLICATION PROGRAMMING INTERFACE IN A CLOUD INFRASTRUCTURE

FIELD OF THE DISCLOSURE

The present disclosure relates generally to cloud computing and, more particularly, to systems and methods to publish internal commands as an application programming interface in a cloud infrastructure.

BACKGROUND

Virtualizing computer systems provides benefits such as an ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment.

Figure 1:
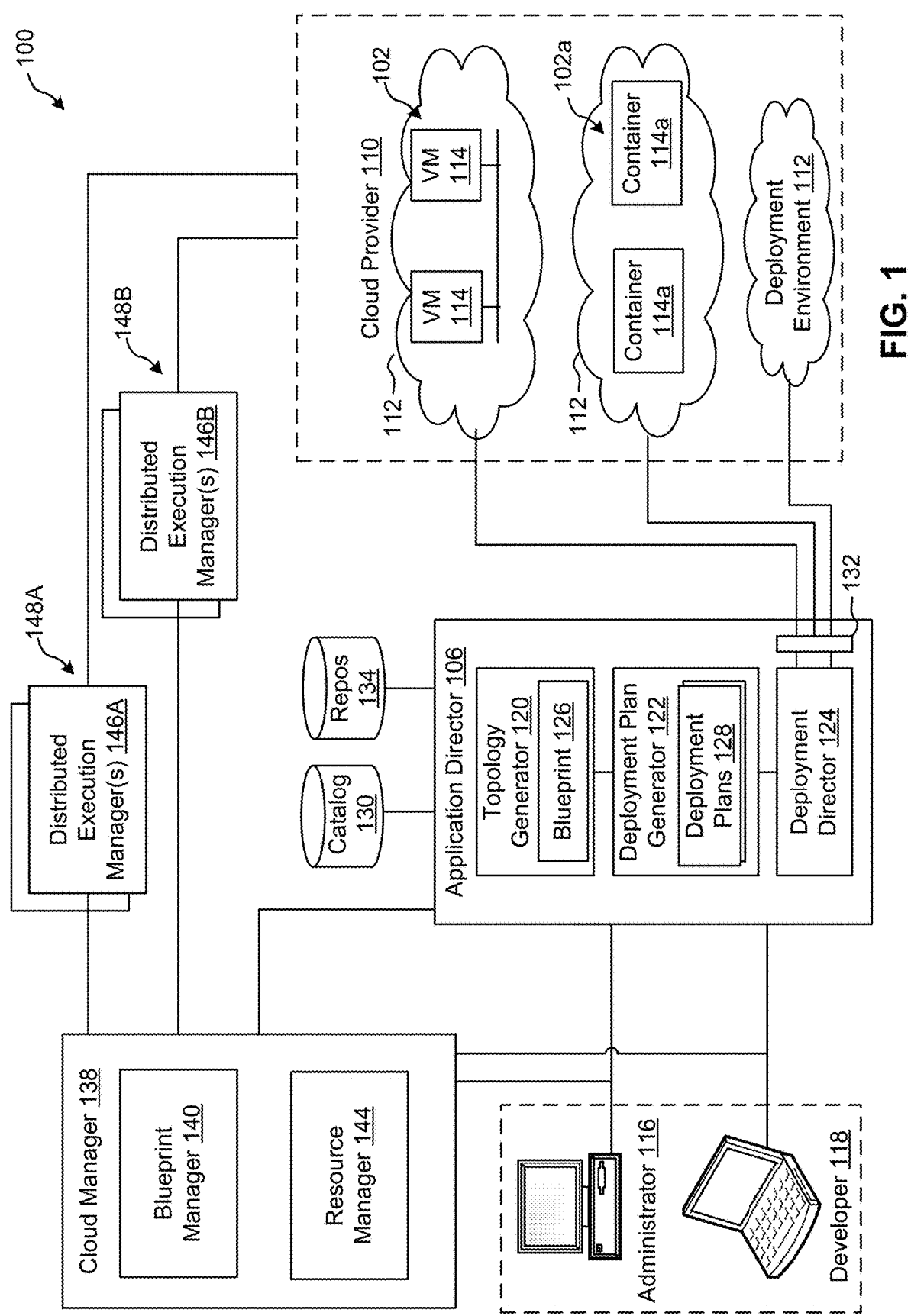
FIG. 1 depicts an example system constructed in accordance with the teachings of this disclosure for managing a cloud computing platform.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Virtualization technologies can be used for computing, storage, and/or networking, for example. Using virtualization, hardware computing resources and/or other physical resources can be replicated in software. One or more application programming interfaces (APIs) can be implemented to provide access to virtualized resources for users, applications, and/or systems while limiting or masking underlying software and/or hardware structure.

Cloud computing is based on the deployment of many physical resources across a network, virtualizing the physical resources into virtual resources, and provisioning the virtual resources to perform cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their entirety.

Cloud computing platforms may provide many powerful capabilities for performing computing operations. However, taking advantage of these computing capabilities manually may be complex and/or require significant training and/or expertise. Prior techniques to providing cloud computing platforms and services often require customers to understand details and configurations of hardware and software resources to establish and configure the cloud computing platform. Methods and apparatus disclosed herein facilitate the management of virtual machine resources in cloud computing platforms.

For example, a cloud computing infrastructure can be developed as a set of internal commands (e.g., shell scripts, etc.). In certain examples, rather than providing internal access (e.g., secure shell (SSH) access, etc.) to the cloud computing infrastructure, an API of commands is provided to interact with functionality of the cloud computing infrastructure. The API can be implemented as a set of configuration files (e.g., Extensible Markup Language (XML) files, etc.) in which each configuration file defines one or more commands to be exposed for interaction with the cloud infrastructure. While a configuration file names and defines a command and its expected input(s) and output(s) for execution by a user, application, system, etc., details of the command (e.g., operations and/or rules tying input(s) to output(s), etc.) can be hidden from an external entity such as a user, application, computing system, etc. Via the API, driven by the configuration files, virtual machine functionality can be instantiated, configured, and executed by one or more users, applications, systems, etc.

A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

As disclosed in detail herein, methods and apparatus disclosed herein provide for automation of management tasks such as provisioning multiple virtual machines for a multiple-machine computing system (e.g., a group of servers that inter-operate), linking provisioned virtual machines and tasks to desired systems to execute those virtual machines or tasks, and/or reclaiming cloud computing resources that are no longer in use. The improvements to cloud management systems (e.g., the vCloud Automation Center (vCAC) from VMware®, the vRealize Automation Cloud Automation Software from VMware®), interfaces, portals, etc. disclosed herein may be utilized individually and/or in any combination. For example, all or a subset of the described improvements may be utilized.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

Example Virtualization Environments

Many different types of virtualization environments exist. Three example types of virtualization environment are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated the process from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

FIG. 1 depicts an example system 100 constructed in accordance with the teachings of this disclosure for managing a cloud computing platform. The example system 100 includes an application director 106 and a cloud manager 138 to manage a cloud computing platform provider 110 as described in more detail below. As described herein, the example system 100 facilitates management of the cloud provider 110 and does not include the cloud provider 110. Alternatively, the system 100 could be included in the cloud provider 110.

The cloud computing platform provider 110 provisions virtual computing resources (e.g., virtual machines, or "VMs," 114) that may be accessed by users of the cloud computing platform 110 (e.g., users associated with an administrator 116 and/or a developer 118) and/or other programs, software, device. etc.

An example application 102 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies on other ones of the VMs 114.

As illustrated in FIG. 1, the example cloud computing platform provider 110 may provide multiple deployment environments 112, for example, for development, testing, staging, and/or production of applications. The administrator 116, the developer 118, other programs, and/or other devices may access services from the cloud computing platform provider 110, for example, via REST (Representational State Transfer) APIs (Application Programming Interface) and/or via any other client-server communication protocol. REST defines computer architectural principles to facilitate Web services involving system resources and resource states. A REST API can expose uniform resource indicators (URIs) to enable client applications to address system resources, for example. Example implementations of a REST API for cloud computing services include a vCloud Administrator Center™ (vCAC) and/or vRealize Automation™ (vRA) API and a vCloud Director™ API available from VMware, Inc. The REST API can provide access to user operations, user elements, user types, extension operations, extension elements, extension types, administrator types, administrator elements, administrator operations, etc.

The example cloud computing platform provider 110 provisions virtual computing resources (e.g., the VMs 114) to provide the deployment environments 112 in which the administrator 116 and/or the developer 118 can deploy multi-tier application(s). One particular example implementation of a deployment environment that may be used to implement the deployment environments 112 of FIG. 1 is vCloud DataCenter cloud computing services available from VMware, Inc.

In some examples disclosed herein, a lighter-weight virtualization is employed by using containers in place of the VMs 114 in the development environment 112. Example containers 114a are software constructs that run on top of a host operating system without the need for a hypervisor or a separate guest operating system. Unlike virtual machines, the containers 114a do not instantiate their own operating systems. Like virtual machines, the containers 114a are logically separate from one another. Numerous containers can run on a single computer, processor system and/or in the same development environment 112. Also like virtual machines, the containers 114a can execute instances of applications or programs (e.g., an example application 102a) separate from application/program instances executed by the other containers in the same development environment 112.

The example application director 106 of FIG. 1, which may be running in one or more VMs, orchestrates deployment of multi-tier applications onto one of the example deployment environments 112. As illustrated in FIG. 1, the example application director 106 includes a topology generator 120, a deployment plan generator 122, and a deployment director 124.

The example topology generator 120 generates a basic blueprint 126 that specifies a logical topology of an application to be deployed. The example basic blueprint 126 generally captures the structure of an application as a collection of application components executing on virtual computing resources. For example, the basic blueprint 126 generated by the example topology generator 120 for an online store application may specify a web application (e.g., in the form of a Java web application archive or "WAR" file including dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, including one or more application packages and their dependent middleware and/or operating systems. Applications may be distributed across multiple VMs. Thus, in the example described above, the term "application" refers to the entire online store application, including application server and database components, rather than just the web application itself. In some instances, the application may include the underlying hardware and/or virtual computing hardware utilized to implement the components.

The example basic blueprint 126 of FIG. 1 may be assembled from items (e.g., templates) from a catalog 130, which is a listing of available virtual computing resources (e.g., VMs, networking, storage, etc.) that may be provisioned from the cloud computing platform provider 110 and available application components (e.g., software services, scripts, code components, application-specific packages) that may be installed on the provisioned virtual computing resources. The example catalog 130 may be pre-populated and/or customized by an administrator 116 (e.g., IT (Information Technology) or system administrator) that enters in specifications, configurations, properties, and/or other details about items in the catalog 130. Based on the application, the example blueprints 126 may define one or more dependencies between application components to indicate an installation order of the application components during deployment. For example, since a load balancer usually cannot be configured until a web application is up and running, the developer 118 may specify a dependency from an Apache service to an application code package.

The example deployment plan generator 122 of the example application director 106 of FIG. 1 generates a deployment plan 128 based on the basic blueprint 126 that includes deployment settings for the basic blueprint 126 (e.g., virtual computing resources' cluster size, CPU, memory, networks, etc.) and an execution plan of tasks having a specified order in which virtual computing resources are provisioned and application components are installed, configured, and started. The example deployment plan 128 of FIG. 1 provides an IT administrator with a process-oriented view of the basic blueprint 126 that indicates discrete actions to be performed to deploy the application. Different deployment plans 128 may be generated from a single basic blueprint 126 to test prototypes (e.g., new application versions), to scale up and/or scale down deployments, and/or to deploy the application to different deployment environments 112 (e.g., testing, staging, production). The deployment plan 128 is separated and distributed as local deployment plans having a series of tasks to be executed by the VMs 114 provisioned from the deployment environment 112. Each VM 114 coordinates execution of each task with a centralized deployment module (e.g., the deployment director 124) to ensure that tasks are executed in an order that complies with dependencies specified in the application blueprint 126.

The example deployment director 124 of FIG. 1 executes the deployment plan 128 by communicating with the cloud computing platform provider 110 via a cloud interface 132 to provision and configure the VMs 114 in the deployment environment 112. The example cloud interface 132 of FIG. 1 provides a communication abstraction layer by which the application director 106 may communicate with a heterogeneous mixture of cloud provider 110 and deployment environments 112. The deployment director 124 provides each VM 114 with a series of tasks specific to the receiving VM 114 (herein referred to as a "local deployment plan"). Tasks are executed by the VMs 114 to install, configure, and/or start one or more application components. For example, a task may be a script that, when executed by a VM 114, causes the VM 114 to retrieve and install particular software packages from a central package repository 134. The example deployment director 124 coordinates with the VMs 114 to execute the tasks in an order that observes installation dependencies between VMs 114 according to the deployment plan 128. After the application has been deployed, the application director 106 may be utilized to monitor and/or modify (e.g., scale) the deployment.

The example cloud manager 138 of FIG. 1 interacts with the components of the system 100 (e.g., the application director 106 and the cloud provider 110) to facilitate the management of the resources of the cloud provider 110. The example cloud manager 138 includes a blueprint manager 140 to facilitate the creation and management of multi-machine blueprints and a resource manager 144 to reclaim unused cloud resources. The cloud manager 138 may additionally include other components for managing a cloud environment.

The example blueprint manager 140 of the illustrated example manages the creation of multi-machine blueprints that define the attributes of multiple virtual machines as a single group that can be provisioned, deployed, managed, etc. as a single unit. For example, a multi-machine blueprint may include definitions for multiple basic blueprints that make up a service (e.g., an e-commerce provider that includes web servers, application servers, and database servers). A basic blueprint is a definition of policies (e.g., hardware policies, security policies, network policies, etc.) for a single machine (e.g., a single virtual machine such as a web server virtual machine and/or container). Accordingly, the blueprint manager 140 facilitates more efficient management of multiple virtual machines and/or containers than manually managing (e.g., deploying) basic blueprints individually. Example management of multi-machine blueprints is described in further detail in conjunction with FIG. 2.

The example blueprint manager 140 of FIG. 1 additionally annotates basic blueprints and/or multi-machine blueprints to control how workflows associated with the basic blueprints and/or multi-machine blueprints are executed. As used herein, a workflow is a series of actions and decisions to be executed in a virtual computing platform. The example system 100 includes first and second distributed execution manager(s) (DEM(s)) 146A and 146B to execute workflows. According to the illustrated example, the first DEM 146A includes a first set of characteristics and is physically located at a first location 148A. The second DEM 146B includes a second set of characteristics and is physically located at a second location 148B. The location and characteristics of a DEM may make that DEM more suitable for performing certain workflows. For example, a DEM may include hardware particularly suited for performance of certain tasks (e.g., high-end calculations), may be located in a desired area (e.g., for compliance with local laws that require certain operations to be physically performed within a country's boundaries), may specify a location or distance to other DEMS for selecting a nearby DEM (e.g., for reducing data transmission latency), etc. Thus, the example blueprint manager 140 annotates basic blueprints and/or multi-machine blueprints with capabilities that can be performed by a DEM that is labeled with the same or similar capabilities.

The resource manager 144 of the illustrated example facilitates recovery of cloud computing resources of the cloud provider 110 that are no longer being activity utilized. Automated reclamation may include identification, verification and/or reclamation of unused, underutilized, etc. resources to improve the efficiency of the running cloud infrastructure.

Figure 2:
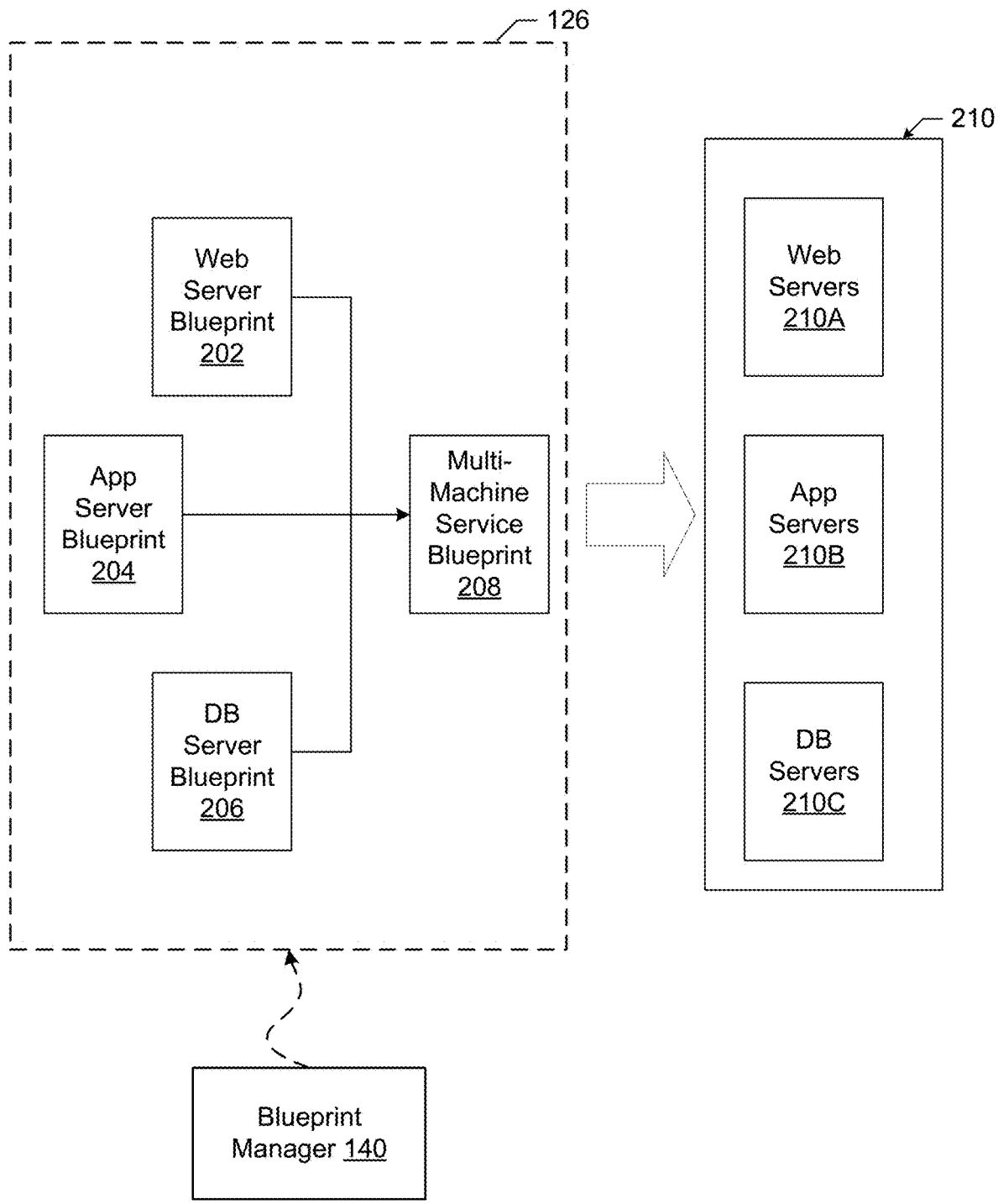
FIG. 2 illustrates an example generation of a multi-machine blueprint by the example blueprint manager of FIG. 1.

FIG. 2 illustrates an example implementation of the blueprint 126 as a multi-machine blueprint generated by the example blueprint manager 140 of FIG. 1. In the illustrated example of FIG. 2, three example basic blueprints (a web server blueprint 202, an application server blueprint 204, and a database (DB) server blueprint 206) have been created (e.g., by the topology generator 120). For example, the web server blueprint 202, the application server blueprint 204, and the database server blueprint 206 may define the components of an e-commerce online store.

The example blueprint manager 140 provides a user interface for a user of the blueprint manager 140 (e.g., the administrator 116, the developer 118, etc.) to specify blueprints (e.g., basic blueprints and/or multi-machine blueprints) to be assigned to an instance of a multi-machine blueprint 208. For example, the user interface may include a list of previously generated basic blueprints (e.g., the web server blueprint 202, the application server blueprint 204, the database server blueprint 206, etc.) to allow selection of desired blueprints. The blueprint manager 140 combines the selected blueprints into the definition of the multi-machine blueprint 208 and stores information about the blueprints in a multi-machine blueprint record defining the multi-machine blueprint 208. The blueprint manager 140 may additionally include a user interface to specify other characteristics corresponding to the multi-machine blueprint 208. For example, a creator of the multi-machine blueprint 208 may specify a minimum number and a maximum number of each blueprint component of the multi-machine blueprint 208 that may be provisioned during provisioning of the multi-machine blueprint 208.

Accordingly, any number of virtual machines (e.g., the virtual machines associated with the blueprints in the multi-machine blueprint 208) and/or containers may be managed collectively. For example, the multiple virtual machines corresponding to the multi-machine blueprint 208 may be provisioned based on an instruction to provision the multi-machine blueprint 208, may be power cycled by an instruction, may be shut down by an instruction, may be booted by an instruction, etc. As illustrated in FIG. 2, an instruction to provision the multi-machine blueprint 208 may result in the provisioning of a multi-machine service formed from one or more VMs 114 that includes virtualized web server(s) 210A, virtualized application server(s) 210B, and virtualized database server(s) 210C. The number of virtual machines and/or containers provisioned for each blueprint may be specified during the provisioning of the multi-machine blueprint 208 (e.g., subject to the limits specified during creation or management of the multi-machine blueprint 208).

The multi-machine blueprint 208 maintains the reference to the basic blueprints 202, 204, 206. Accordingly, changes made to the blueprints (e.g., by a manager of the blueprints different than the manager of the multi-machine blueprint 208) may be incorporated into future provisioning of the multi-machine blueprint 208. Accordingly, an administrator maintaining the source blueprints (e.g., an administrator charged with managing the web server blueprint 202) may change or update the source blueprint and the changes may be automatically propagated to the machines provisioned from the multi-machine blueprint 208. For example, if an operating system update is applied to a disk image referenced by the web server blueprint 202 (e.g., a disk image embodying the primary disk of the web server blueprint 202), the updated disk image is utilized when deploying the multi-machine blueprint. Additionally, the blueprints may specify that the machines 210A, 210B, 210C of the multi-machine service 210 provisioned from the multi-machine blueprint 208 operate in different environments. For example, some components may be physical machines, some may be on-premise virtual machines, and some may be virtual machines at a cloud service.

Several multi-machine blueprints may be generated to provide one or more varied or customized services. For example, if virtual machines deployed in the various States of the United States require different settings, a multi-machine blueprint could be generated for each state. The multi-machine blueprints could reference the same build profile and/or disk image, but may include different settings specific to each state. For example, the deployment workflow may include an operation to set a locality setting of an operating system to identify a particular state in which a resource is physically located. Thus, a single disk image may be utilized for multiple multi-machine blueprints reducing the amount of storage space for storing disk images compared with storing a disk image for each customized setting.

Figure 3A:
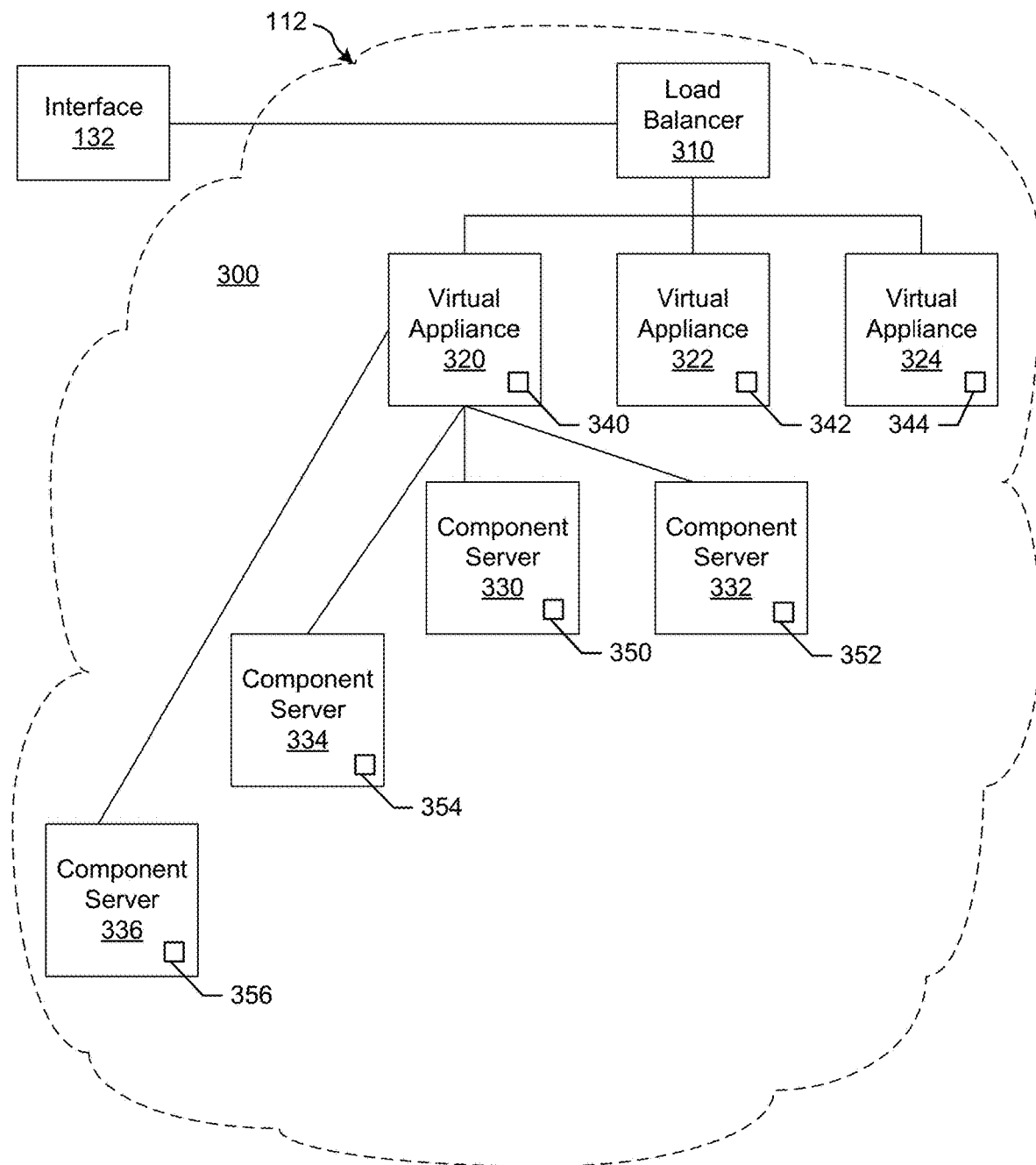
FIG. 3A illustrates an example installation of deployed virtual machines and associated servers acting as hosts for deployment of component servers for a customer.

FIG. 3A illustrates an example installation of deployed appliances or virtual appliances (vAs) (e.g., VMs 114 and/or containers 114a) and associated virtualized servers acting as hosts for deployment of component servers (e.g., Web server, application server, database server, etc.) for a customer. The vAs can be deployed as an automation tool, for example, used to deliver VMs and associated applications for on-premise automation and/or handling of external cloud resources (e.g., Microsoft Azure™, Amazon Web Services™, etc.).

As shown in the example of FIG. 3A, an installation 300 includes a load balancer (LB) 310 to assign tasks and/or manage access among a plurality of vAs 320, 322, 324. Each vA 320-324 is a deployed VM 114 and/or container 114a. In this example, the vA 320 communicates with a plurality of component or host servers 330, 332, 334, 336 which store components for execution by users (e.g., Web server 210A with Web components, App server 210B with application components, DB server 210C with database components, etc.). As shown in the example of FIG. 3A, component servers 334, 336 can stem from component server 330 rather than or in addition to directly from the virtual appliance 320, although the vA 320 can still communicate with such servers 334, 336. The LB 310 enables the multiple vAs 320-324 and multiple servers 330-336 to appear as one device to a user. Access to functionality can then be distributed among appliances 320-324 by the LB 310 and among servers 330-336 by the respective appliance 320, for example. The LB 310 can use least response time, round-robin, and/or other method to balance traffic to vAs 320-324 and servers 330-336, for example.

In the example installation 300, each vA 320, 322, 324 includes a management endpoint 340, 342, 344. Each component server 330, 332, 334, 336 includes a management agent 350, 352, 354, 356. The management agents 350-356 can communicate with their respective endpoint 340 to facilitate transfer of data, execution of tasks, etc., for example.

In certain examples, management endpoints 340, 342, 344 share a data store, and any management agent 350-356 can connect to any management endpoint 340, 342, 344 to retrieve a task and/or associated data from the data store. Thus, management endpoints 340, 342, 344 are interconnected via the data store. In certain examples, a management endpoint 340-342 doubles as an agent 350-356, allowing the endpoint 340-344 on a vA 320-324 to automate a task on another vA 320-324. Additionally, in certain examples, each agent 350-356 maintains a pool of available endpoints 340-344. If an endpoint 340-344 becomes unresponsive, the agent 350-356 can automatically switch to a different endpoint 340-344, from which the agent 350-356 can retrieve execution tasks. Agents 350-356 connected via different endpoints 340-344 can initiate task execution from a plurality of vAs 320-324, even if not currently connected to that vA 320-324 because, due to the connection between endpoints 340-344, for example.

In certain examples, the management agents 350-356 synchronize component servers 330-336 with the vA 320-324 and facilitate host access and associated services (e.g., hostd, ntpd, sfcbd, slpd, wsman, vobd, etc.). The management agents 350-356 can communicate with their respective endpoint 340 to facilitate transfer of data, execution of tasks, etc., for example. The relationship between management endpoint 340, 342, 344 and associated management agents 350, 352, 354, 356 can be used to deploy and install software on multiple component machines 330, 332, 334, 336. In certain examples, component servers 330-336 can be installed and/or managed even when the vA 320-324 and/or its endpoint 340-344 are physically restricted from accessing the server 330-336 and/or its agent 350-356. The agent 350-356 polls the endpoint 340-344 for work items, so an inbound connection to the component server 330-336 can be absent, for example.

In certain examples, a graphical user interface associated with a front end of the load balancer 310 guides a customer through one or more questions to determine system requirements for the installation 300. Once the customer has completed the questionnaire and provided firewall access to install the agents 350-356, the agents 350-356 communicate with the endpoint 340 without customer involvement. Thus, for example, if a new employee needs a Microsoft Windows® machine, a manager selects an option (e.g., clicks a button, etc.) via the graphical user interface to install a VM 114 and/or container 114a that is managed through the installation 300. To the user, he or she is working on a single machine, but behind the scenes, the virtual appliance (vA) 320 is accessing different servers 330-336 depending upon what functionality is to be executed.

In certain examples agents 350-356 are deployed in a same data center as the endpoint 340 to which the agents 350-356 are associated. The deployment can include a plurality of agent servers 330-336 distributed worldwide, and the deployment can be scalable to accommodate additional server(s) with agent(s) to increase throughput and concurrency, for example.

In some examples, a management agent 350 is included in the virtual appliance 320, 322, 324 to facilitate execution of instructions at the virtual appliance 320, 322, 324. For example, the example management endpoint 340 might instruct a management agent operated at the virtual appliance 320 to execute an instruction to update the management endpoint 340. In some examples, the instructions that can be executed by a management agent operated at the virtual appliance 320 are different from the instructions that can be executed by a management agent operated at the component server 330, 332, 334, 336. For example, if the virtual appliance 320 were operated in a Linux environment and the component server 330 were operated in a Microsoft Windows® environment, the instructions supported by a management agent operated in each of those environments may be different (e.g., some of the instructions may be restricted and/or may not be available for execution on one or more of the systems).

Figure 3B:
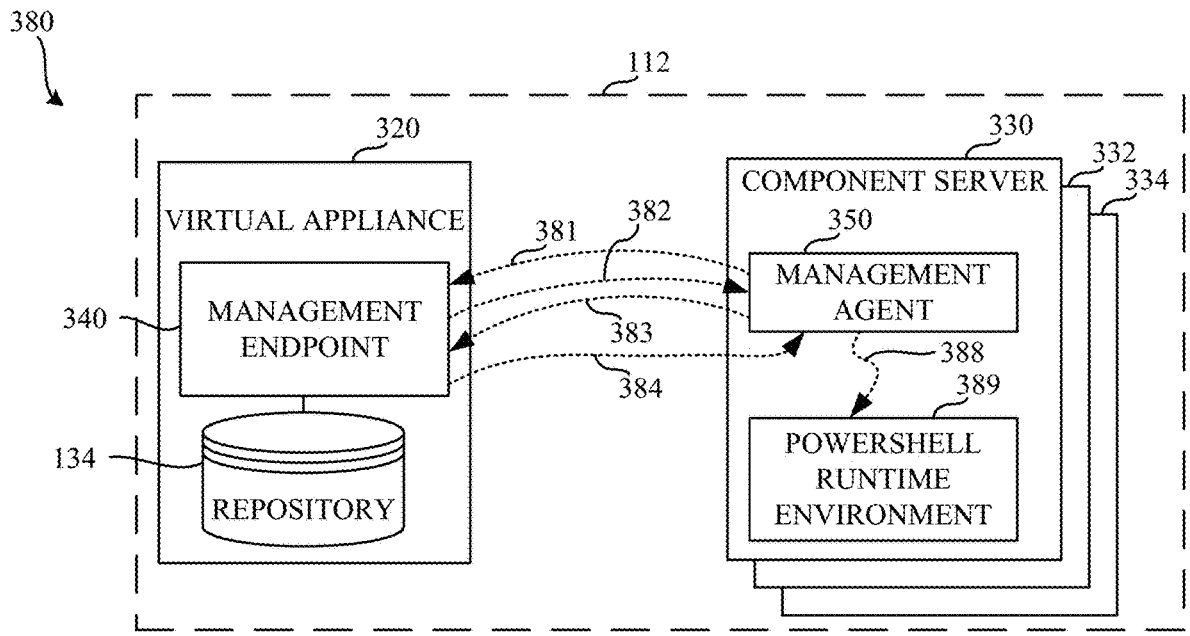
FIG. 3B is a block diagram representing an example arrangement of the virtual appliance of FIG. 3A operating the management endpoint, and the component server of FIG. 3A operating the management agent.

FIG. 3B is a block diagram representing an example arrangement 380 of the virtual appliance 320 of FIG. 3A operating the management endpoint 340, and the component server 330 of FIG. 3A operating the management agent 350. In the illustrated example of FIG. 3B, both the vA 320 and the component server 330 of FIG. 3B are operated within the same deployment environment 112. In the illustrated example of FIG. 3B, the example vA 320 includes the management endpoint 340 and the repository 134. In some examples, the repository 134 is implemented by another component of the deployment environment 112 that is separate from the vA 320. The example component server 330 includes the management agent 350 and a PowerShell™ runtime environment 389. The example PowerShell™ runtime environment 389 of the illustrated example of FIG. 3B is implemented by the Microsoft™ PowerShell™ framework. The PowerShell™ runtime environment 389 executes PowerShell™ scripts, commands, files, etc. at the direction of the management agent 350. In the illustrated example of FIG. 3B, the PowerShell™ runtime environment 389 is specific to implementations on component server(s) 330, 332, 334 that implement a Microsoft™ Windows™ Operating system. However, any other runtime environment and/or instruction execution system may additionally or alternatively be used. For example, the example PowerShell™ runtime environment 389 may be replaced by a script interpreter (e.g., a Perl interpreter, a Python interpreter, etc.).

While, in the illustrated example of FIG. 3B, the management agent 350 interfaces with the PowerShell™ runtime environment 389, not all instructions to be executed at the component server 330 are executed outside of the management agent 350. In some examples, the management agent 350 may execute instructions internally without interfacing with the PowerShell™ runtime environment 389 (or some other external runtime environment). In some examples, functionality of the management agent 350 can be extended using a plug-in framework. That is, functionality can dynamically be added to the management agent 350 to enable new instructions to be executed internal to the management agent 350, without requiring a new version of the management agent 350 to be deployed. For example, whereas a command issued by the management endpoint 340 to the management agent 350 requesting that the management agent 350 report the local time of the component server 330 might ordinarily cause the management agent 350 to interface with the PowerShell™ runtime environment 389 to retrieve the local system time, such functionality can be added to the management agent 350 (e.g., a function may be executed within the management agent 350 to retrieve the local system time). Thus, interfacing with the PowerShell™ runtime environment 389 might not be necessary. As a result, computational overhead involved with invoking external runtime environments (e.g., the PowerShell™ runtime environment 389) is reduced.

In the illustrated example of FIG. 3B, the example management agent 350 requests an indication of an instruction to be executed from the management endpoint 340 (line 381). The management endpoint 340 provides the indication of the instruction to be executed to the management agent 350 (line 382). In some examples, the indication of the instruction to be executed is formatted as a name of a command and parameters that are to be used when executing the command. However, the example indication of the instruction may be provided in any other format, such as an extensible markup language (XML) document, other configuration file, etc., that identifies, for example, a name of the instruction to be executed (e.g., "Get_Local_Time", "perform_upgrade.ps1", etc.), a location from which the instruction is to be retrieved, one or more parameter (e.g., command line parameters) that are to be used and/or specified when executing the instruction, an expected result of the instruction, and/or any other information to facilitate execution of the instruction at the component server 330.

As used herein, a command is a collection of one or more instructions that can be executed internally with respect to the management agent 350. While a command is executed internally with respect to the management agent 350, in some examples, execution of the command (and/or instructions associated with the command) may invoke execution of instructions external to the management agent 350 (e.g., may invoke execution of a PowerShell™ script, an executable file, etc.).

The management agent 350 attempts to identify whether the command is known to the management agent 350 (e.g., the command can be implemented by a package that is currently loaded by the management agent 350, or the command is implemented by a package that is stored locally and can be loaded by the management agent 350, etc.) and, if the management agent 350 determines that the command is not known to the management agent 350, the management agent 350 requests a package (line 383) from the management endpoint 340 that, when loaded by the management agent 350, enables the management agent 350 to execute the command named in the indication of the instruction to be executed. In the illustrated example of FIG. 3B, the management endpoint 340 provides the package to the management agent 350 (line 384). The management agent 350 then loads the package, and executes the command named in the indication of the instruction to be executed (which was enabled via the loading of the provided package). In some examples, the execution of the command named in the indication of the instruction causes the management agent 350 to interface with the PowerShell™ runtime environment 389 to execute other instructions (line 388) (e.g., a PowerShell™ script, an executable file, etc.). In some examples, the other instructions are provided as part of the package. In some examples, the package is implemented using an archive file (e.g., a .zip file, a .rar file, etc.) that includes components to be executed (e.g., dynamically linked library (DLL) files, plugin files, binary executables, etc.) and a description file. The description file is formatted as an extensible markup language (XML) file and identifies commands that are supported by one or more of the components to be executed, for example.

Figure 3C:
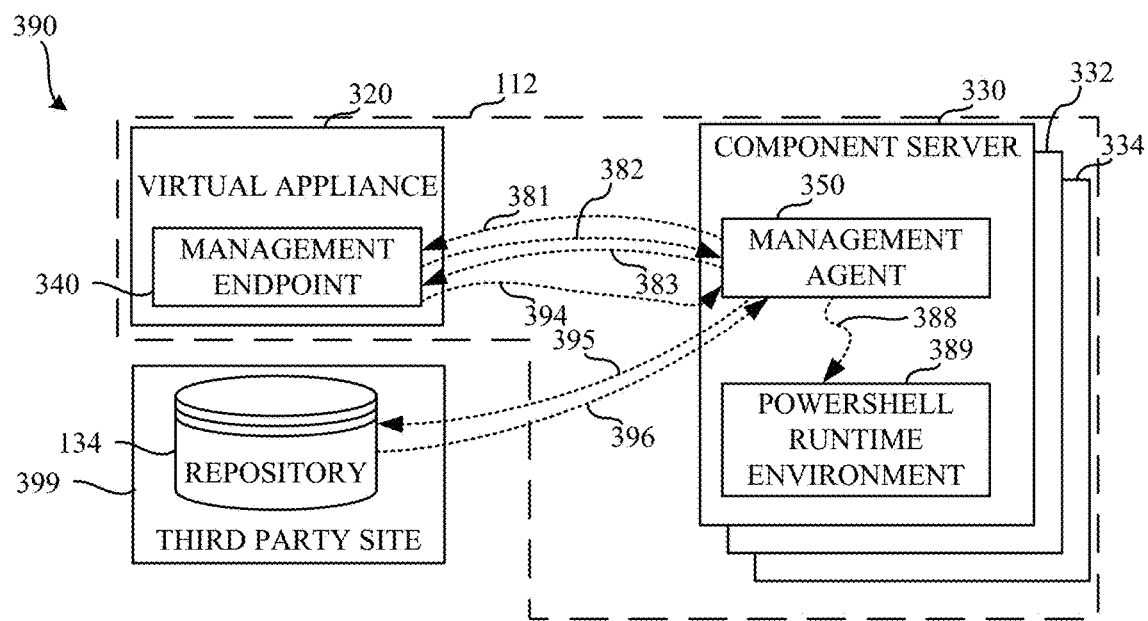
FIG. 3C is a block diagram representing an example alternative arrangement of the virtual appliance of FIG. 3A operating the management endpoint, and the component server of FIG. 3A operating the management agent.

FIG. 3C is a block diagram representing an example alternative arrangement 390 of the virtual appliance of FIG. 3A operating the management endpoint, and the component server of FIG. 3A operating the management agent. In contrast to the example arrangement 380 of FIG. 3B, the example arrangement 390 of FIG. 3C implements the example repository 134 at a third party site 399 that is outside of the deployment environment 112. In such an example, instead of the management endpoint 340 directly providing the package to the management agent 350, the management endpoint 340 may provide a link to the package and/or other information identifying where the package can be retrieved (line 394). The management agent 350 then requests the package from the repository 134 (line 395), and receives a response including the package (line 396). The management agent 350 then loads the package, and executes the command named in the indication of the instruction to be executed (which was enabled via the loading of the provided package).

In the illustrated example of FIG. 3C, the repository 134 from which the management agent 350 retrieves the package is managed and/or operated by a third party organization (e.g., a professional service organization (PSO)) that manages and/or develops instructions (e.g., develops executable code, develops workflows, develops plugins, etc.). Such an approach enables an administrator of the deployment environment to easily work with third party software providers (e.g., consultants, PSOs, plugin providers, etc.) that create instructions (e.g., executable files, plugin files, etc.) that may be customized for the deployment environment 112. In this manner, the administrator can simply direct the management endpoint 340 to cause the management agents 350 to retrieve the instructions from the repository 134 hosted at the third party site 399 by the third party organization, and execute those instructions. Such an approach alleviates storage needs within the deployment environment 112. Such an approach also facilitates more rapid development and deployment of instructions, as instructions need not first be populated into a repository within the deployment environment 112.

Figure 4:
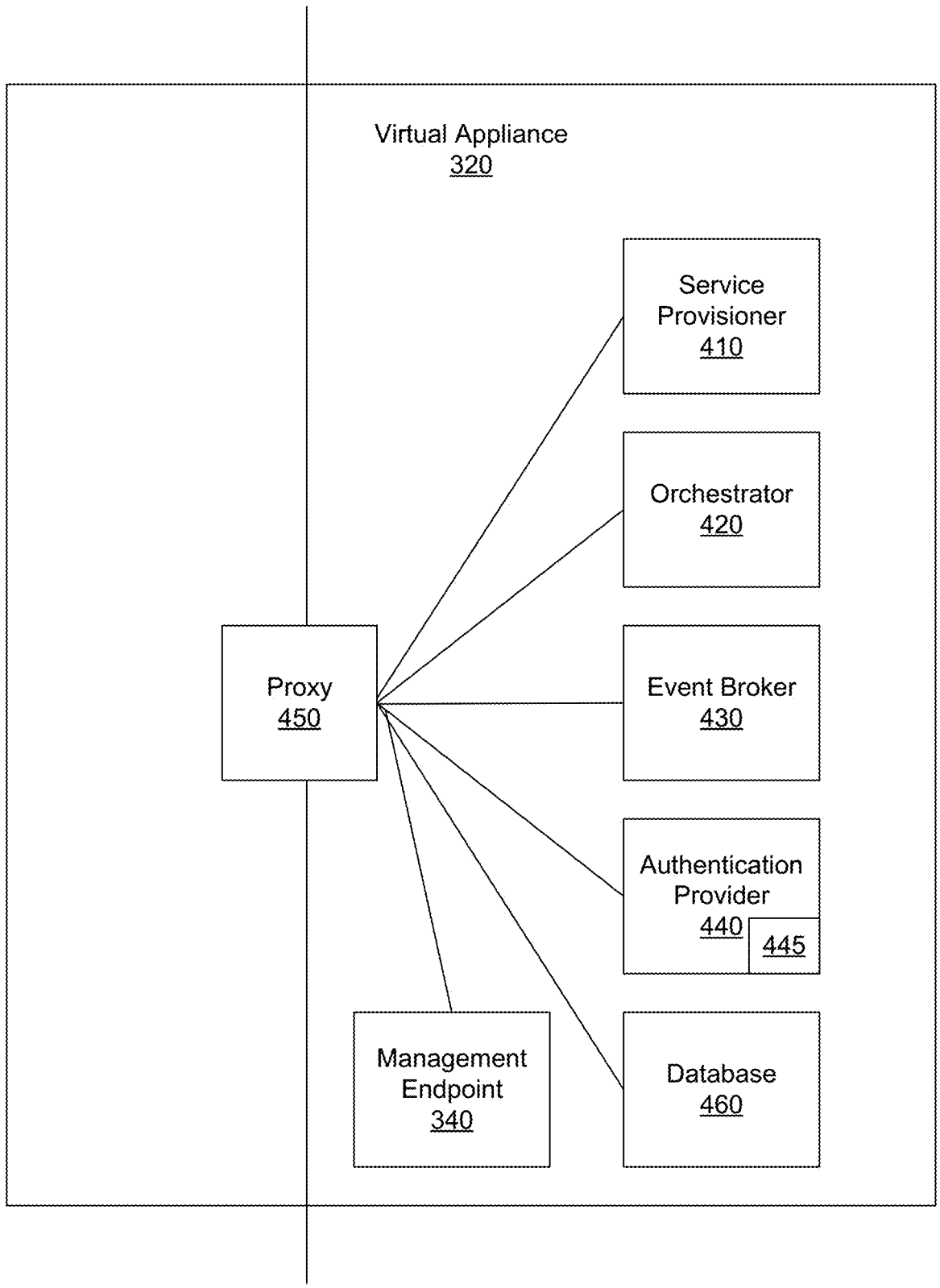
FIG. 4 illustrates an example implementation of a virtual appliance.

FIG. 4 illustrates an example implementation of the vA 320. In the example of FIG. 4, the vA 320 includes a service provisioner 410, an orchestrator 420, an event broker 430, an authentication provider 440, an internal reverse proxy 450, and a database 460, as well as the management endpoint 340. The components 410, 420, 430, 440, 450, 460 of the vA 320 may be implemented by one or more of the VMs 114. The example service provisioner 410 provides services to provision interfaces (e.g., Web interface, application interface, etc.) for the vA 320. The example orchestrator (e.g., vCO) 420 is an embedded or internal orchestrator that can leverage a provisioning manager, such as the application director 106 and/or cloud manager 138, to provision VM services but is embedded in the vA 320. For example, the vCO 420 can be used to invoke a blueprint to provision a manager for services.

Example services can include catalog services, identity services, component registry services, event broker services, IaaS, XaaS, etc. Catalog services provide a user interface via which a user can request provisioning of different preset environments (e.g., a VM including an operating system and software and some customization, etc.), for example. Identity services facilitate authentication and authorization of users and assigned roles, for example. The component registry maintains information corresponding to installed and deployed services (e.g., uniform resource locators for services installed in a VM/vA, etc.), for example. The event broker provides a messaging broker for event-based communication, for example. The IaaS provisions one or more VMs and/or containers for a customer via the vA 320. The XaaS can extend the provisioning to also request, approve, provision, operate, and decommission any type of catalog items (e.g., storage, applications, accounts, and anything else that the catalog provides as a service).

The example event broker 430 provides a mechanism to handle tasks which are transferred between services with the orchestrator 420. The example authentication provider 440 (e.g., VMware Horizon™ services, etc.) authenticates access to services and data, for example. The authentication provider 440 can facilitate authentication and registration of certificate(s) to allow communication between the management endpoint 340 and one or more management agents 350-356, for example. In certain examples, the authentication provider 440 includes a certificate validator 445 to validate and/or otherwise verify authenticity and applicability of a certificate to communication and/or service provisioning for the agent 350-356 and associated component sever 330-336 with respect to the vA 320.

The components of the vA 320 access each other through REST API calls behind the internal reverse proxy 450 (e.g., a high availability (HA) proxy HAProxy) which provides a high availability load balancer and proxy for Transmission Control Protocol (TCP)- and Hypertext Transfer Protocol (HTTP)-based application requests. In this example, the proxy 450 forwards communication traffic from within the vA 320 and/or between vAs 320, 322, 324 of FIG. 3 to the appropriate component(s) of the vA 320. In certain examples, services access the local host/proxy 450 on a particular port, and the call is masked by the proxy 450 and forwarded to the particular component of the vA 320. Since the call is masked by the proxy 450, components can be adjusted within the vA 320 without impacting outside users.

Figure 5:
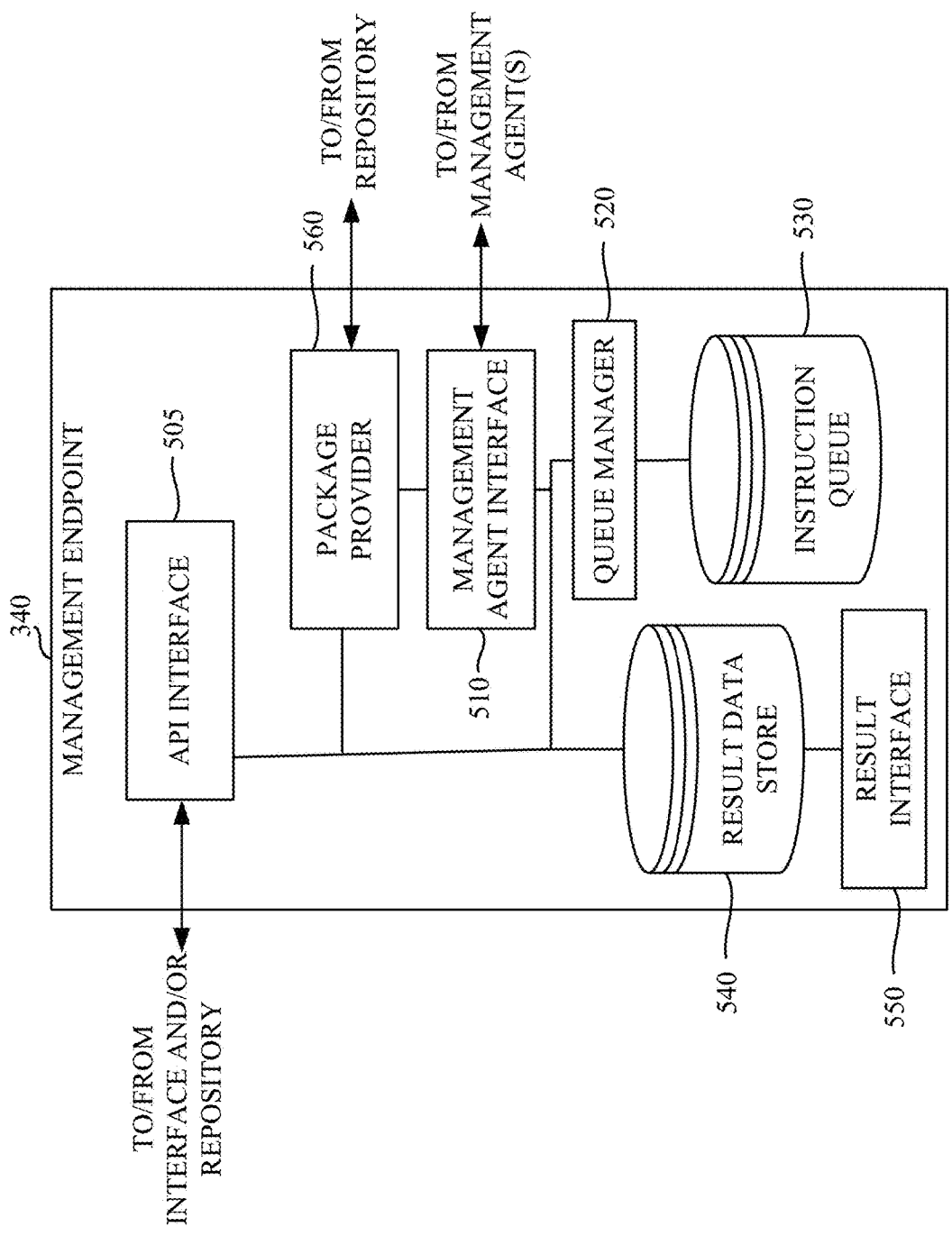
FIG. 5 illustrates a block diagram of an example implementation of a management endpoint.

FIG. 5 is a block diagram representing an example implementation of the example management endpoint 340 of the example vA 320 of FIGS. 3A, 3B, 3C, and/or 4. The example management endpoint 340 of FIG. 5 includes an API interface 505, a management agent interface 510, a queue manager 520, an instruction queue 530, a result data store 540, and a result interface 550.

The example API interface 505 of the illustrated example of FIG. 5 implements a REST (Representational State Transfer) API (Application Programming Interface) that is responsive to requests received via the interface 132. In some examples, the example API interface 505 handles incoming requests from the interface 132 and identifies an instruction stored in the instruction queue 530 to be executed by the management endpoint 340 and/or management agent 350. The example API interface 505 responds to the request with an indication of the instruction to be executed. In some examples, the indication of the instruction to be executed is formatted as an extensible markup language (XML) document (e.g., a configuration file, and/or other document including instruction(s), information such as credential to authenticate and/or validate the agent 350 and/or endpoint 340, etc.) that identifies, for example, a name of the instruction to be executed (e.g., "perform_upgrade.ps1"), a location from which the instruction is to be retrieved, one or more parameter (e.g., command line parameters, etc.) that are to be used and/or specified when executing the instruction, an expected result of the instruction, and/or any other information to facilitate execution of the instruction at the vA 320, component server 330, remote host, etc. Other type(s) and/or format(s) for the indication of the instruction to be executed may additionally or alternatively be used.

The example management agent interface 510 of the illustrated example of FIG. 5 also implements a REST API that is responsive to requests from the management agent 350 for indications of instructions in the instruction queue 530. In some examples, the example management agent interface 510 handles incoming requests from management agent(s), and identifies an instruction stored in the instruction queue 530 to be executed by the management agent from which the request was received. The example management agent interface 510 responds to the request with an indication of the instruction to be executed. In some examples, the indication of the instruction to be executed is formatted as an extensible markup language (XML) document (e.g., a configuration file, and/or other document including instruction(s), information such as credential to authenticate and/or validate the agent 350 and/or endpoint 340, etc.) that identifies, for example, a name of the instruction to be executed (e.g., "perform_upgrade.ps1"), a location from which the instruction is to be retrieved, one or more parameter (e.g., command line parameters, etc.) that are to be used and/or specified when executing the instruction, an expected result of the instruction, and/or any other information to facilitate execution of the instruction at the component server 330. Other type(s) and/or format(s) for the indication of the instruction to be executed may additionally or alternatively be used.

As noted above, the example management agent interface 510 implements a REST API. However, any other approach to implementing the example management agent interface 510 may additionally or alternatively be used. In some examples, the management agent 350 periodically and/or aperiodically polls and/or otherwise requests instructions from the management agent interface 510. The example management agent interface 510 responds to such requests with an indication of an instruction (if any) to be executed by the example management agent 350. However, any other approach to informing the example management agent 350 may additionally or alternatively be used. For example, the example management agent interface 510 may provide an interface for the management agent 350 to subscribe to indications of instructions from the management endpoint 340 such that the management agent interface 510 contacts the management agent 350 to inform the management agent 350 of the instruction for execution. Such an approach may be implemented using a REST subscription interface. However, any other type of subscription interface may additionally or alternatively be used.

The example queue manager 520 of the illustrated example of FIG. 5 manages a queue of instructions to be executed by the example management agent 350. In some examples, instructions are added to the queue at the request of an administrator. However, instructions may be added to the queue in response to any other event such as, a scheduled task, an error identified by a management agent, etc. In some examples, multiple queues are managed corresponding to multiple management agents that work in communication with the management endpoint 340. Upon receipt of an indication of whether an instruction in the queue has been executed at a component server 330, the example queue manager 520 removes the instruction from the instruction queue 530 associated with that component server 330. However, in some examples, the instruction may remain in the queue, but be labeled with a status of the execution of the instruction. Thus, when a request is received for an instruction to be executed, a result of such query might be limited to only those instructions where execution has not already been attempted.

The example instruction queue 530 of the illustrated example of FIG. 5 stores indications of instructions to be executed at a component server 330 (e.g., at the direction of the management agent 350 of each component server 330). In some examples, additional parameter(s) concerning the indication of the instructions are also stored in the instruction queue 530 such as, a name of the instruction to be executed (e.g., "perform_upgrade.ps1"), a location from which the instruction is to be retrieved, one or more parameters (e.g., command line parameters) that are to be used and/or specified when executing the instruction, an expected result of the instruction, an indication of one or more instructions to be executed and/or actions to be performed when a result of the execution of the instruction does not match the expected result, and/or any other information to facilitate execution of the instruction at the component server 330. In some examples, the example instruction queue 530 may be any device for storing data such as, flash memory, magnetic media, optical media, etc. Furthermore, the data stored in the example instruction queue 530 may be in any data format such as, binary data, comma delimited data, tab delimited data, structured query language (SQL) structures, etc. While, in the illustrated example, the example instruction queue 530 is illustrated as a single database, the example instruction queue 530 may be implemented by any number and/or type(s) of databases.

The example result data store 540 of the illustrated example of FIG. 5 stores results of the execution of instructions by the management agents 350. In some examples, the example result data store 540 may be any device for storing data such as, flash memory, magnetic media, optical media, etc. Furthermore, the data stored in the example result data store 540 may be in any data format such as, binary data, comma delimited data, tab delimited data, structured query language (SQL) structures, etc. While, in the illustrated example, the example result data store 540 is illustrated as a single database, the example result data store 540 may be implemented by any number and/or type(s) of databases.

The example result interface 550 of the illustrated example of FIG. 5 enables an administrator to review the results of the instruction execution(s) stored in the example result data stored 540. In some examples, the example result interface 550 is implemented as a webpage. However, any other approach to implementing the result interface 550 may additionally or alternatively be used.

The example package provider 560 of the illustrated example of FIG. 5 responds to a request for a package received via the management agent interface 510. In the illustrated example of FIG. 5, the request for a package indicates a command that was identified to a management agent 350 for execution. The example package provider 560 searches the repository 134 for a package and/or other configuration file (e.g., xml file, etc.) that implements the identified command, and provides the identified package, a link to the package to the management agent 350, or an error message indicating that the package could not be found, for example.

Figure 6:
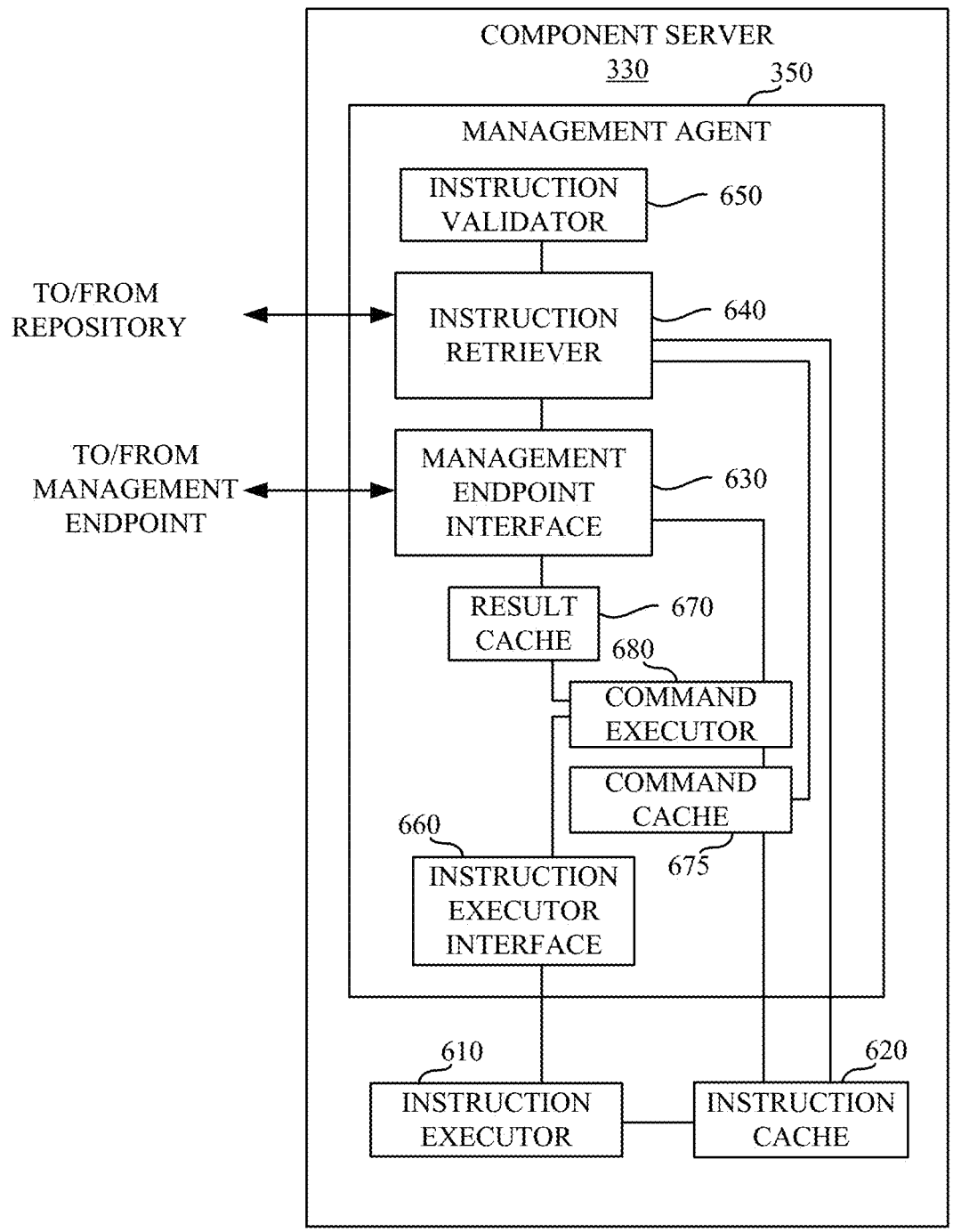
FIG. 6 is a block diagram representing an example implementation of an example component server.

FIG. 6 is a block diagram representing an example implementation of the example component server 330 of the illustrated example of FIG. 3A. The example component server 330 includes the management agent 350, an instruction executor 610, and an instruction cache 620. The example management agent 350 includes a management endpoint interface 630, an instruction retriever 640, an instruction validator 650, an instruction executor interface 660, a result cache 670, a command cache 675, and a command executor 680.

The example instruction executor 610 of the illustrated example of FIG. 6 executes instructions stored in the instruction cache 620 at the request of the instruction executor interface 660. The example instruction executor 610 is implemented by a command execution framework such as, for example the Microsoft™ PowerShell™ framework. However, any other type of command execution framework such as, a scripting interpreter framework (e.g., Perl, Python, etc.), an executable framework, an operating system kernel, etc., may additionally or alternatively be used.

In some examples, the example instruction executor 610 is separate from the management agent 350. Since the instruction executor 610 is separate from the management agent 350, the instruction executor 610 can execute instructions that affect the operation of the management agent 350. For example, the instruction executor 610 may execute an instruction that causes the management agent 350 to become updated and/or upgraded. Such an upgrade and/or installation of the management agent 350 may involve uninstalling the management agent 350 having a first version and subsequently installing the management agent 350 having a second version. In some examples, the management agent 350 might alternatively be downgraded to address, for example, an issue encountered subsequent to a prior upgrade and/or installation. Enabling the management agent 350 to be updated and/or upgraded by the instruction executor 610 is beneficial because, through the use of distributed execution of such installations, upgrades can be completed in a more timely fashion as compared to manual installation of an upgrade. Thus, a plurality of (e.g., tens, hundreds, or thousands, etc.) of management agents 350 can rapidly be upgraded, rebooted, restarted, etc.

The example instruction cache 620 of the illustrated example of FIG. 6 is a local storage of the component server 330. In some examples, the example instruction cache 620 is a directory within a file system hosted by the example component server 330. However, in some examples, the example instruction cache 620 may be implemented by any type of file storage system. In some examples, the example instruction cache 620 may be remote from the component server 330.

The example management endpoint interface 630 of the illustrated example of FIG. 6 transmits a request to the management endpoint 340 for an indication of an instruction to be executed at the component server 330. In some examples, the request is formatted using a representational state transfer (REST) protocol. However, any other past, present, and/or future protocol and/or approach for requesting an indication of an instruction to be executed may additionally or alternatively be used. In some examples, the example management endpoint 340 responds to the request with an indication of the instruction to be executed. The example indication of the instruction to be executed is formatted as a command to be executed by the command executor 680. However, any other type and/or format for the indication of the instruction to be executed may additionally or alternatively be used.

In some examples, the management endpoint interface 630 periodically polls and/or otherwise requests instructions from the management endpoint 340. However, any other periodic and/or aperiodic approach to requesting an indication of an instruction from the management endpoint 340 may additionally or alternatively be used such as, polling the management endpoint 340 when resources of the component server 330 are idle, polling the management endpoint 340 in response to completion of execution of a prior instruction, etc. In some examples, the example management endpoint interface 630 may subscribe to indications of instructions from the management endpoint 340 such that the management endpoint 340 contacts the management endpoint interface 630 via the subscription connection to inform the management agent 350 of the instruction for execution. Such an approach may be implemented using a REST subscription interface. However, any other type of subscription interface may additionally or alternatively be used.

The example instruction retriever 640 of the illustrated example of FIG. 6 receives a command/instruction and determines whether command and/or instructions identified in the indication received from the management endpoint 340 are loaded in the command cache 675 and/or are stored in the instruction cache 620 and, if not, attempts to retrieve the instructions from the management endpoint. In some examples, the example instruction retriever 640 inspects plugins loaded in the command cache 675 for a plugin that can operate the command. In some examples, the example instruction retriever 640 inspects package files stored in the instruction cache 620 by, for example, inspecting a description file identifying the commands supported by each corresponding package file. In some examples, the example instruction retriever 640 retrieves the package from the repository 134 at the direction of the management endpoint 340. That is, in some examples, when providing the indication of the instruction to be executed, the management endpoint 340 identifies the repository and/or another location where the package may be retrieved. In some examples, the indication of the instruction to be executed also identifies a version of the instruction and/or package (e.g., version 1.2, etc.) to be executed and/or loaded into the command cache 675. In such an example, in addition to determining that the instruction and/or package is present in the instruction cache 620, the example instruction retriever 640 verifies whether a specified version of the instruction and/or package is either loaded in the command cache 675 and/or is present in the instruction cache 620. If the specified version is not loaded and/or present, the specified version of the instruction and/or package is either loaded into the command cache 675 or is retrieved from the repository 134 and loaded into the command cache 675.

In some examples, the instruction/command and/or package (e.g., XML file, etc.) can be provided from the interface 132 as an API call or trigger (e.g., by a REST service, etc.). The interface 132 can provide access to one or more instructions and/or commands via the API, and instruction(s)/command(s) can be routed to the management agent 350 via the management endpoint interface 630. The management agent 350 can execute the command and/or route the instruction/command to the component server 330 and/or vA 320 for execution, for example.

The example instruction executor interface 660 of the illustrated example of FIG. 6 interacts with the instruction executor 610 to cause the instruction executor 610 to execute the instructions stored in the instruction cache 620 (e.g., the file system of the component server 330). In some examples, the instructions may be stored in the instruction cache 620 as a result of requesting the package from the management agent 340. In some examples, the example instruction executor interface 660 provides input parameters to the instruction executor 610 specified in the indication of the instruction to be executed provided by the management endpoint 340.

As noted above, the example instruction executor 610 is separate from the management agent 350 and/or the example instruction executor interface 660. The example instruction executor 610 executes the instructions in a separate execution space from the instruction executor interface 660 and, more generally, the management agent 350. As a result, at the direction of the instruction executor interface 660, the instruction executor 610 can execute instructions that affect the operation of the management agent 350.

The example instruction executor interface 660 of the illustrated example of FIG. 6 monitors an output of the instruction executor 610. In some examples, the example instruction executor interface 660 monitors a standard output (e.g., a command line output) of the instruction executor 610. However, any other approach to monitoring an output of the example instruction executor 610 may additionally or alternatively be used such as, a standard error interface, an event log, an output file, etc. The example instruction executor interface 660 passes the result of the execution of the instruction to the example command executor 680, which may store the result in the example result cache 670.

While enabling the management agent 350 to interact with an external instruction executor 610 allows a wide range of instructions to be executed, not all instructions are executed outside of the management agent 350. In some examples, it is more computationally efficient to execute commands internal to the management agent 350. For example, instructions may be loaded into the command cache 675 for execution by the command executor 680. By loading instructions into the command cache 675, the command cache 675 and/or the command executor 680 can implement an API to provide access to commands and/or instructions without requiring a user login, secure shell (SSH) login, internal system access, etc. Instead, the command is surfaced via the API for selection and/or other trigger via a command line interface, graphical interface, automated script, etc.

The example command cache 675 of the illustrated example of FIG. 6 is implemented by a memory space utilized by the management agent 350. In some examples, a portion of a package (e.g., one or more dynamically linked libraries (DLLs), etc.) is loaded into the command cache 675 from the instruction cache 620 such that commands and/or functions provided by the portion of the package can be executed by the command executor 680. In some examples, the example instruction retriever 640 inspects the command cache 675 to determine whether a command identified for execution by the management agent 350 is loaded.

The example command executor 680 executes commands and/or instructions loaded in the command cache 675 at the direction of the management endpoint interface 630. In some examples, execution of the commands and/or instructions loaded in the command cache 675 involves communicating with the instruction executor interface 660 to interface with the instruction executor 610. That is, in some examples, the commands and/or instructions loaded in the command cache 675 may invoke some instructions to be executed by an execution framework outside of the management agent 350. In the illustrated example of FIG. 6, the example command executor 680 stores results of the execution of the commands and/or instructions loaded in the command cache 675 and/or the instructions executed by the instruction executor 610 in the result cache 670.

The example result cache 670 of the illustrated example of FIG. 6 stores execution results collected by the command executor and/or instruction executor interface 660. Results stored in the example result cache 670 may be cleared (e.g., deleted and/or otherwise removed) from the result cache 670 when the example management endpoint interface 630 transmits the results stored in the result cache 670 to the management endpoint 340. In some examples, the example result cache 670 may be any device for storing data such as, flash memory, magnetic media, optical media, etc. Furthermore, the data stored in the example result cache 670 may be in any data format such as, binary data, comma delimited data, tab delimited data, structured query language (SQL) structures, etc. While, in the illustrated example, the example result cache 670 is illustrated as a single database, the example result cache 670 may be implemented by any number and/or type(s) of databases.

Example Infrastructure Installation and/or Configuration

In certain examples, a cloud computing (e.g., vCAC™ vRA™ etc.) deployment includes one or more vAs 320-324 and one or more component servers 330-336 (e.g., Microsoft Windows™ machines, etc.) on which are installed components (e.g., software such as Web services, application services, database services, etc.) that form the IaaS portion of the product. In a distributed and/or high availability deployment, a plurality of component servers 330-336 form the installed product, and having to install the IaaS components manually on all of the component servers 330-336 is a time-consuming process, involving, among other things, multiple context switches and many opportunities for user misconfiguration of the deployed system. For example, manual installation involves installing components on an appliance, downloading an installer, and then visit each server to install the components manually using the installer. However, if a component is deployed out of order, the installation may not function. Additionally, data entry is required for each manual installation, and mis-typing of the manual data entry can invalidate the entire installation. Further, such a mistake may not be realized until the erroneous installation is deployed, resulting in lost time, money, errors, and inoperable systems. Simplification and automation of this process reduces the time needed and errors involved in setting up a new instance of the cloud computing system.

In certain examples, rather than requiring customers to manually install an IaaS component on each server 330-336, installation can be facilitated by a command (e.g., a command API executed by the management endpoint 340, management agent 350, and/or a PowerShell command executed on the vA 320, a remote server, etc.) without requiring a SSH login, internal system access, etc.

Figure 7:
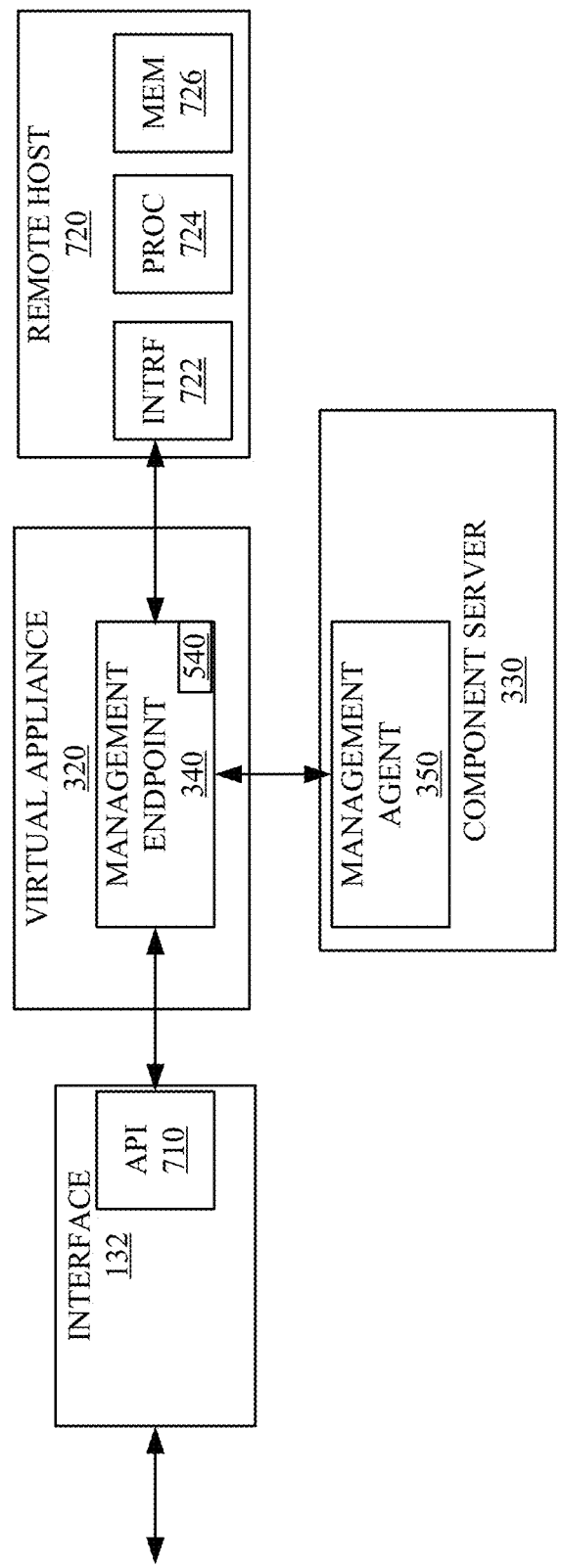
FIG. 7 illustrates an alternate view of an example virtual machine installation.

FIG. 7 illustrates an alternate view of the example virtual machine installation 300. As shown in the example of FIG. 7, the interface 132 includes an application programming interface (API) 710, which communicates with the management endpoint 340 of the virtual appliance 320. The API 710 receives a request from a user, program, system, etc., via the interface 132. The API 710 routes a trigger, request, or other selection of a command/instruction to the management endpoint 340 of the vA 320 for internal execution via the deployment environment 112. The API 710 trigger can be packaged as an execution task for the ME 340, for example. The ME 340 receives the execution task from the interface 132 via the API 710 and processes the execution task to determine how a command/instruction associated with the API execution task is to be processed. For example, the command and/or other instruction may be processed by the MA 350 and/or its component server 330. Alternatively, the command/instruction may be processed by a remote host 720. For example, a command to collect logs is executed by the MA 350 to collect logs from associated component server(s) 330-336. A command to change user password, however, reaches the ME 340, and the password change occurs on the associated vA 320, for example. The ME 340 routes the command/instruction extracted from the execution task to the MA 350 and/or remote host 720 based on the parsing the execution task by the ME 340. The MA 350/vA 320 and/or the remote host 720 then executes the command/instruction and returns an execution status and/or execution result to the result database 540, for example.

For example, the remote host 720 includes an interface 722 to receive the command/instruction from the ME 340 and a processor 724 to process the command for execution and/or to trigger execution using one or more connected components. The remote host 720 includes a memory 726 to store an outcome and/or other output of the command execution. The remote host 720 can provide an execution status update to the ME 340 using the memory 726 and the interface 722 after the command has been executed and/or triggered for execution using the processor 724, for example.

Figure 8:
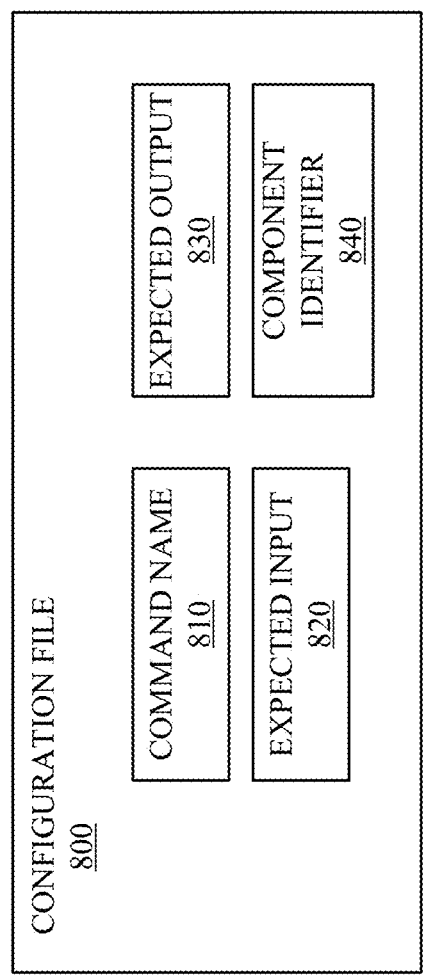
FIG. 8 illustrates an example configuration file accessible via an application programming interface to codify an execution task for a virtual installation.

FIG. 8 illustrates an example configuration file 800 accessible via the API 710 codifying an execution task for the virtual installation 300 (e.g., the ME 340, MA 350, remote host 720, etc.). For example, the execution task can be represented as the configuration file 800 (e.g., XML, Javascript, etc.) that defines one or more commands to be exposed and executed via the API 710. The configuration or definition file/script 800 includes a command name 810 and a definition of expected input(s) 820 for the command 810. Some input(s) can be hidden from the end user via the configuration file 800 and API 710, and default value(s) for input(s) 820 can be provided in the configuration file 800, for example. In certain examples, the configuration file 800 can include a definition of expected output(s) 830 from execution of the command 810 (if applicable). The configuration file 800 can also allow an identifier 840 associated with a particular component (e.g., component server(s) 330-336, remote host 720, other cloud infrastructure component, etc.) to be specified for routing, triggering, and/or execution of the command 810, for example. The API 710 surfaces or provides access to the configuration file 800 via the interface 132, and an external actor such as a user, program, system, etc., can select and/or otherwise trigger execution of the configuration file 800 to initiate internal execution of the associated command 810 via the ME 340, for example.

Figure 9:
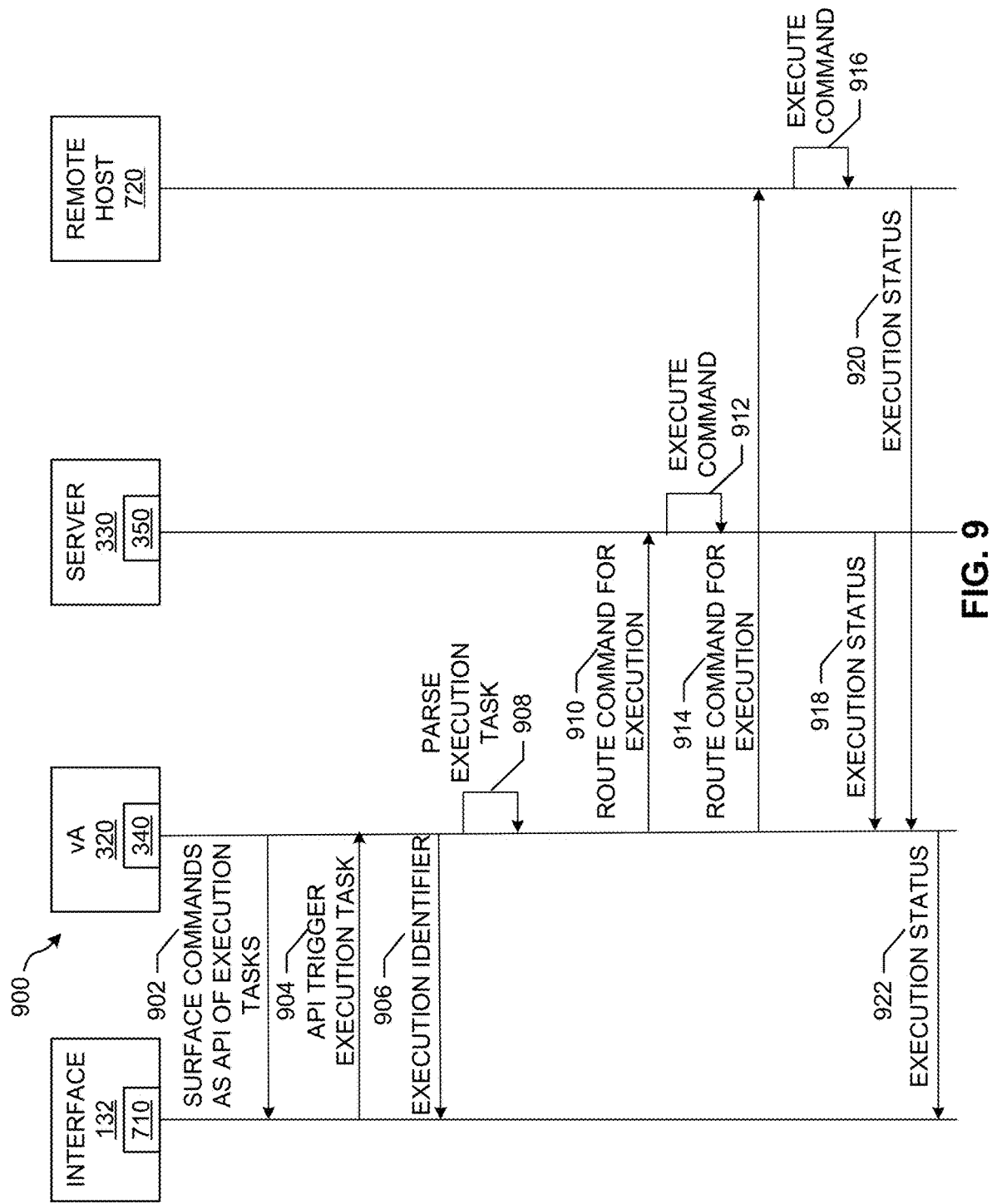
FIG. 9 illustrates an example data flow diagram showing an exchange of information between an interface, a management endpoint, and a management agent.

FIG. 9 illustrates an example data flow diagram showing an exchange 900 of commands and information between the interface 132 (and its API 710), the vA 320 (and its ME 340), the component server 330 (and its MA 350), and the remote host 720 to provide an API of commands to external user(s), program(s), and/or system(s) to execute functionality internal to the system 300. At 902, one or more commands are surfaced from the ME 340 as an API 710 via the interface 132 (e.g., a user interface, a system interface, a program communication interface, etc.). For example, one or more commands that execute internal to the system 300 (e.g., by the vA 320 and/or its management endpoint 340 and/or by the component server 330 and/or its management agent 350, by remote host 720 via the management endpoint 340, etc.) can be made available (e.g., "surfaced") to an external user, program, system, etc., by packaging the command(s) using a REST service and/or other service via the API 710 accessible via the interface 132. Commands include validation, installation (e.g., database, manager, agent, certificate, etc.), configuration, prerequisite check, cluster, health check, update (e.g., agent, server, vA, IaaS, etc.), certificate import, etc., for example.

At 904, the API 710 is triggered via the interface 132. For example, a user, program, and/or system selects a command for execution via the API 710 made available via the interface 132. The API 710 allows the selection to be packaged as an execution task to trigger underlying functionality in the system 300. The trigger can include an XML file, Javascript, etc., formulated as an execution task for the ME 340.

For example, the execution task can be a configuration file (e.g., XML, Javascript, etc.), such as the configuration file 800, and/or other wrapper that defines one or more commands to be exposed and executed via the API 710. Selecting the configuration file 800 associated with a desired command (e.g., via a graphical user interface, command line interface, etc.) triggers relay of the file 800 and its parameters to the ME 340 and subsequent execution of the associated command. For example, as described above with respect to FIG. 8, the configuration or definition file/script 800 includes a command name 810 and a definition 820 of expected input(s) for the command. Some input(s) can be hidden from the end user via the configuration file 800 and API 710, and default value(s) for input(s) 820 can be provided in the configuration file 800, for example. In certain examples, the configuration file 800 can include a definition 830 of expected output(s) from execution of the command (if applicable). The configuration file 800 can also include an identifier 840 associated with a particular component (e.g., a node identifier representing a component server(s) 330-336, remote host 720, other cloud infrastructure component, etc.) to be specified for routing, triggering, and/or execution of the command, for example.

At 906, the API 710 provides an execution identifier associated with the triggered execution task. The identifier can allow the requester (e.g., the system, program, user, etc.) to track execution of the selected command. Since the execution occurs internal to the system 300 and apart from the requester's interaction with the API 710, the execution identifier allows the requester to inquire as to the status of the execution task.

The ME 340 receives the execution task from the interface 132, and at 908, the ME 340 parses the execution task to identify one or more commands and associated component(s) to trigger/execute the command(s). For example, the ME 340 analyzes the command(s) encoded in the execution task configuration file 800 to determine what component(s) is/are to trigger and/or execute the command. For example, a command can be identified by the ME 340 as a command to be executed by the MA 350 (and its vA 320) based on the command name 810, expected input 820, expected output 830, and/or component identifier 840 from the configuration file 800. A command can be identified by the ME 340 as a command to be triggered and/or otherwise executed by the remote host 720 based on the command name 810, expected input 820, expected output 830, and/or component identifier 840 from the configuration file 800, for example. The management endpoint 340 can determine which component(s) (e.g., management agent 350, remote host 720, etc.) are to trigger/execute a command by comparing the command name 810 to a list, set, or database of commands associated with system components/processing functionality, evaluating expected input(s) 820 and/or output(s) 830 associated with the command, examining the component identifier 840, extracting other definition from the configuration file 800 representing the execution task, etc.

At 910, when the command received via the execution task is a command to be routed to the MA 350, the management endpoint 340 routes the command for execution by the MA 350 and/or its component server 330. For example, the command can be sent to and stored in the example command cache 675 of the MA 350 or the instruction cache 620 of the component server 330. At 912, the command is executed by the MA 350/component server 330. For example, a logging command can be executed by the MA 350 to collect logs from associated server(s) 330.

At 914, when the command received via the execution task is a command to be routed to the remote host 720, the management endpoint 340 routes the command to be triggered and/or otherwise executed by the remote host 720, such as a password/authentication server, hypervisor, other remote workstation or server, etc. At 916, the command is executed and/or triggered for execution by the remote host 720. For example, the remote host 720 executes a change password command to change a user password at the remote host 720.

At 918, the MA 350 provides a status update regarding command execution to the ME 340. For example, the vA 320 executes a validation, installation (e.g., database, manager, agent, certificate, etc.), configuration, prerequisite check, cluster, health check, update (e.g., agent, server, vA, IaaS, etc.), certificate import, and/or other command and provides the ME 340 with an indication that the command has completed its execution, is currently being executed by the vA 320, was unable to execute, etc. Execution of the command occurs without visibility to the requester, and the MA 350 provides the execution status to the ME 340.

At 920, the remote host 720 provides a status update regarding command execution to the ME 340. For example, the remote host 720 executes a password change, authentication, installation, configuration, and/or other command and provides the ME 340 with an indication that the command has completed its execution, is currently being executed by the remote host 720, was unable to execute, etc. Execution of the command occurs without visibility to the requester, and the remote host 720 provides the execution status to the ME 340.

At 922, the ME 340 provides a status update regarding command execution to the interface 132. Thus, the API 710 can be leveraged to output a command execution status to inform the user, program, system, etc., regarding execution of the command triggered by the API 710 via the interface 132, for example. The execution status can be associated with the execution identifier so that the requester can be notified of application execution status via the API 710 and the interface 132, for example. In certain examples, the API 710 provides a status retrieval API which uses the execution identifier to determine and return an execution status or state (e.g., in progress, completed, failed, etc.). In some example, the status retrieval API may also return details regarding the execution state (e.g., output, component identification 840, comparison to expected output 830, etc.).

While example implementations of the example cloud computing system 100 and virtual machine installation 300 are illustrated in FIGS. 1-9, one or more of the elements, processes and/or devices illustrated in FIGS. 1-9 may be combined, divided, re-arranged, omitted, eliminated and/or implemented in any other way. Further, the example application director 106, example cloud provider 110, example interface 132, example cloud manager 138, example distributed execution managers 146A, 146B, example multi-machine service 210, example load balancer 310, example virtual appliances 320-324, example component servers 330-336, example management endpoints 340-344, example management agents 350-356, example API 710, example remote host 720, and/or, more generally, the example systems 100 and/or 300 of FIGS. 1-9 can be implemented by hardware, software, firmware and/or any combination of hardware, software and/or firmware. Thus, for example, any of the example application director 106, example cloud provider 110, example interface 132, example cloud manager 138, example distributed execution managers 146A, 146B, example multi-machine service 210, example load balancer 310, example virtual appliances 320-324, example component servers 330-336, example management endpoints 340-344, example management agents 350-356, example API 710, example remote host 720, and/or, more generally, the example systems 100 and/or 300 of FIGS. 1-9 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example application director 106, example cloud provider 110, example interface 132, example cloud manager 138, example distributed execution managers 146A, 146B, example multi-machine service 210, example load balancer 310, example virtual appliances 320-324, example component servers 330-336, example management endpoints 340-344, example management agents 350-356, example API 710, example remote host 720, and/or, more generally, the example systems 100 and/or 300 of FIGS. 1-9 is/are hereby expressly defined to include a tangible computer readable storage device or storage disk such as a memory, a digital versatile disk (DVD), a compact disk (CD), a Blu-ray disk, etc. storing the software and/or firmware. Further still, the example application director 106, example cloud provider 110, example interface 132, example cloud manager 138, example distributed execution managers 146A, 146B, example multi-machine service 210, example load balancer 310, example virtual appliances 320-324, example component servers 330-336, example management endpoints 340-344, example management agents 350-356, example API 710, example remote host 720, and/or, more generally, the example systems 100 and/or 300 of FIGS. 1-9 may include one or more elements, processes and/or devices in addition to, or instead of, those illustrated in FIGS. 1-9, and/or may include more than one of any or all of the illustrated elements, processes and devices.

Figure 10:
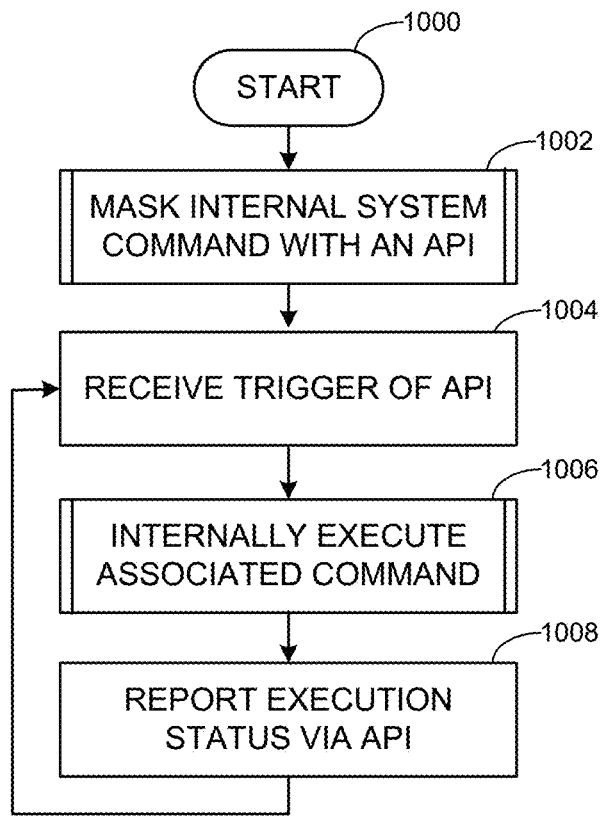
FIGS. 10-12 depict a flowcharts representative of computer readable instructions that may be executed to implement example infrastructure installation.
Figure 11:
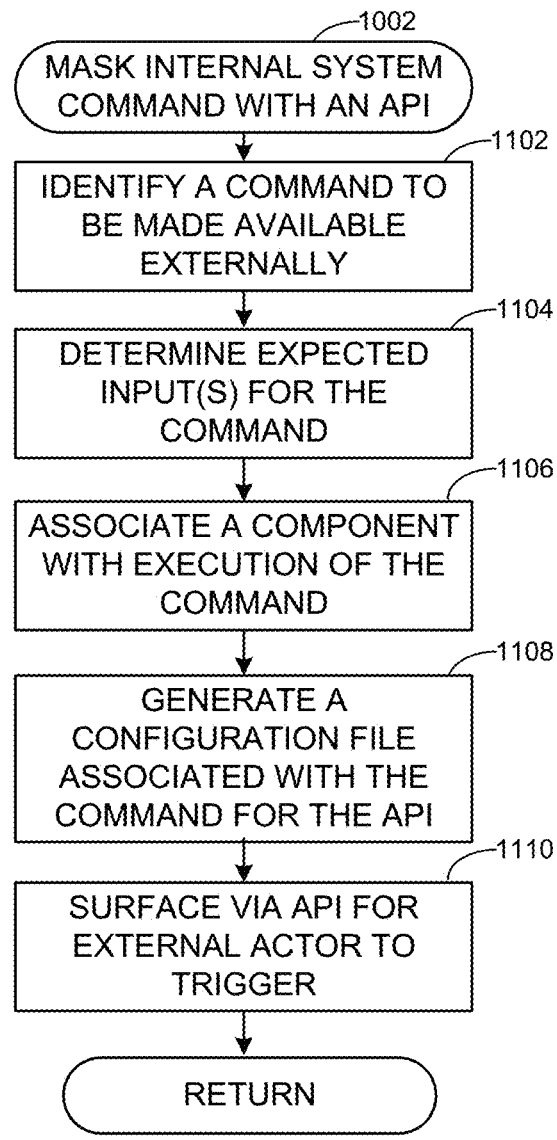
Figure 12:
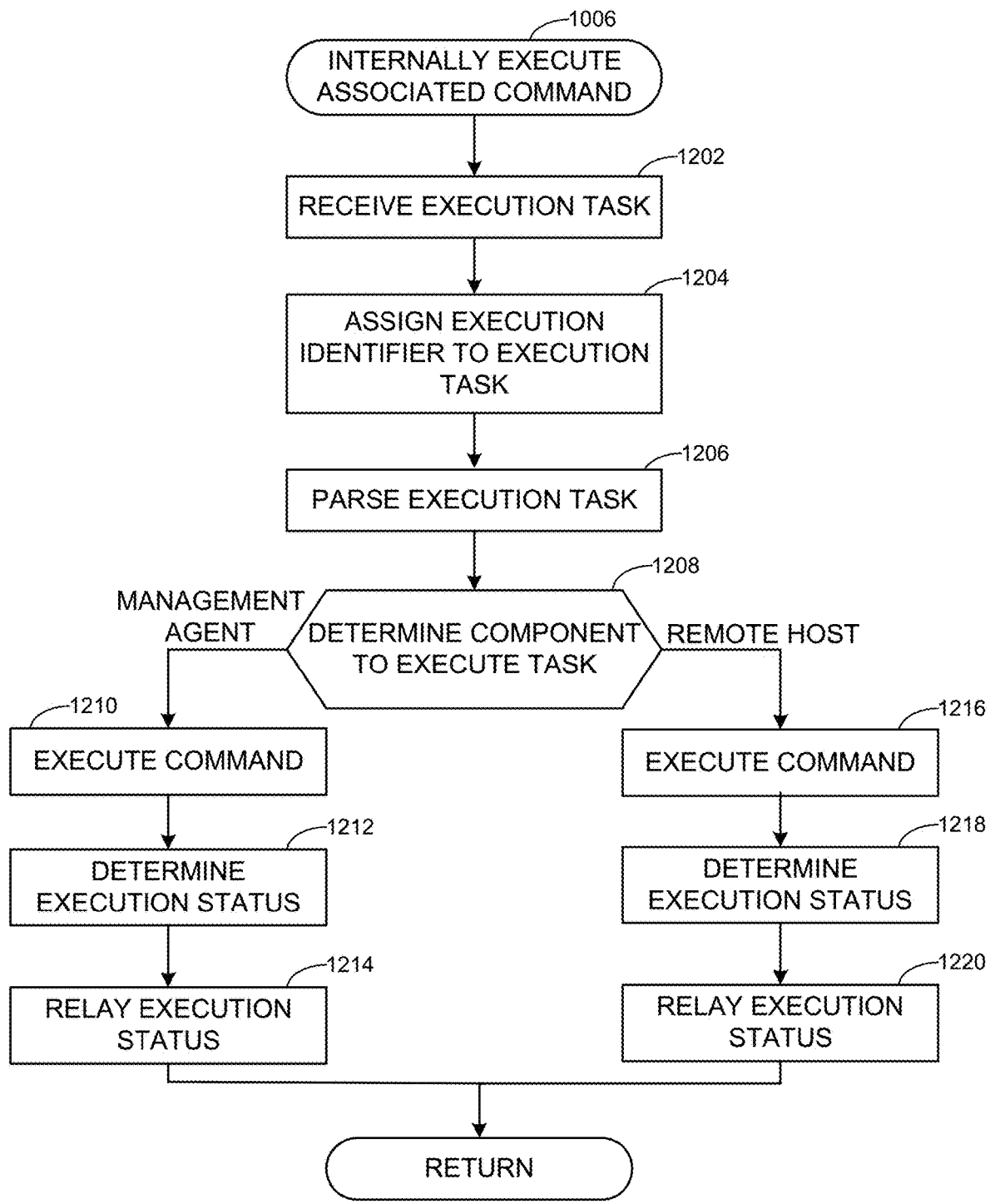

Flowcharts representative of example machine readable instructions that may be executed to deploy and manage the example application director 106, example cloud provider 110, example interface 132, example cloud manager 138, example distributed execution managers 146A, 146B, example multi-machine service 210, example load balancer 310, example virtual appliances 320-324, example component servers 330-336, example management endpoints 340-344, example management agents 350-356, example API 710, example remote host 720, and/or, more generally, the example systems 100 and/or 300 of FIGS. 1-9 are shown in FIGS. 10-12. In these examples, the machine readable instructions implement programs for execution by a processor such as the processor 1312 shown in the example processor platform 1300 discussed below in connection with FIG. 13. The programs may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example programs are described with reference to the flowcharts illustrated in FIGS. 10-12, many other methods of deploying, managing, and updating workload domains in accordance with the teachings of this disclosure may alternatively be used. For example, the order of execution of the blocks may be changed, and/or some of the blocks described may be changed, eliminated, or combined.

As mentioned above, the example processes of FIGS. 10-12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. In some examples, the example processes of FIGS. 10-12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the informa-tion). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 10 depicts a flowchart representative of computer readable instructions that may be executed to implement the example infrastructure installation 300. An example program 1000 is illustrated in FIG. 10. Initially, at block 1002, an internal system command is masked using an application programming interface (API) 710. For example, a system command such as a validation, installation (e.g., database, manager, agent, certificate, etc.), configuration, prerequisite check, cluster, health check, update (e.g., agent, server, vA, IaaS, etc.), certificate import, PowerShell™ command, and/or other command is hidden or masked behind the API 710. Thus, a requestor (e.g., a user, a program, a computing system, etc.) can interact with functionality of the installation 300 (e.g., the ME 340/vA 320, the MA 350/component server 330, remote host 720, etc.) without having access (e.g., via SSH or gateway, etc.) to internals of the system 300.

At block 1004, an API trigger is received. For example, the API 710 is triggered via the interface 132 by a user, program, and/or system. The API 710 allows the selection to be packaged as an execution task or wrapper to trigger underlying functionality in the system 300. The trigger can include an XML file, Javascript, and/or other configuration file/script, etc., formulated as an execution task for the ME 340. The API trigger can include an identification of a component to execute the command (e.g., a node identifier (ID), etc.), for example.

At block 1006, the command associated with the API trigger is executed. For example, one or more components of the installation 300, such as the ME 340, MA 350, remote host 720, etc., execute, trigger the execution, and/or assist in the execution of the command(s). For example, installing component server(s) 330, configuring virtual appliance(s) 320, configuring hypervisors, logging errors, etc., can be executed by the virtual machine installation 300 and opaque to the requester that triggered the command via the API 710 of the interface 132.

At block 1008, an execution status is reported via the API 710. For example, a status retrieval API 710 can be called to provide an indication of command execution status, such as an acknowledgement, success/failure, output/outcome, etc. The execution status can be provided via the interface 132 using the API 710, for example.

FIG. 11 illustrates an example implementation of masking an internal system command with an API at block 1002 of the example flow diagram of FIG. 10. At block 1102, a command is identified as a command to be made available externally. For example, a PowerShell™ command, vA 320 command, component server 330 command, remote host 720 command, etc., is identified as a command to be made available to an external requester outside the system 300 (e.g., a user, a computer program, a computer system, etc.).

At block 1104, expected input(s) are determined for the command. For example, one or more parameters and/or other input(s) such as source, target, node ID, username, password, encryption key, database identifier, instruction, server, etc., can be provided as part of the API 710 with the command. In some examples, some input(s) for a command are visible to a requester via the API 710 and other input(s) are associated with the command but hidden or masked from external view via the API 710. Default values can be set for visible and/or hidden inputs, for example.

In certain examples, at block 1106, a component of the installation 300 can be associated with execution of the command. For example, a node and/or other machine ID can be associated with the command as the component of the system 300 to be used in executing the command when triggered by the API 710. In other examples, a system component can be dynamically determined for execution at runtime based on available resources, input parameters, etc.

At block 1108, a configuration file associated with eth command is generated for the API 710. For example, the command and its input(s) and/or associated component(s) can be formulated as an execution task such as the configuration file 800 (e.g., XML, Javascript, etc.) and/or other wrapper that defines one or more commands to be exposed and executed via the API 710. Selecting the configuration file 800 associated with a desired command (e.g., via a graphical user interface, command line interface, etc.) triggers relay of the file 800 and its parameters to the ME 340 and subsequent execution of the associated command. For example, as described above with respect to FIG. 8, the configuration or definition file/script 800 includes a command name 810 and a definition 820 of expected input(s) for the command. Some input(s) can be hidden from the end user via the configuration file 800 and API 710, and default value(s) for input(s) 820 can be provided in the configuration file 800, for example. In certain examples, the configuration file 800 can include a definition 830 of expected output(s) from execution of the command (if applicable). The configuration file 800 can also include an identifier 840 associated with a particular component (e.g., a node identifier representing a component server(s) 330-336, remote host 720, other cloud infrastructure component, etc.) to be specified for routing, triggering, and/or execution of the command, for example.

At block 1110, the representation of the command is surfaced or exposed as part of the API 710 to an external actor. For example, the configuration file 800 for the command is surfaced or exposed as part of the API 710 available to an external requester via the interface 132.

FIG. 12 illustrates an example implementation internally executing an associated command at block 1006 of the example flow diagram of FIG. 10. At block 1202, an execution task is received at the management endpoint 340. For example, selection of the configuration file 800 for a command via the API 710 and the interface 132 triggers an execution task received at the ME 340. At block 1204, an execution identifier is assigned to the execution task. For example, the ME 340 assigns an execution identifier to the execution task so that the execution of associated command(s) can be tracked.

At block 1206, the execution task is parsed to identify the command and associated information. For example, the ME 340 receives the execution task from the interface 132 and parses the execution task to identify one or more commands and associated component(s) to trigger/execute the command(s).

At block 1208, a component to be used to trigger and/or execute the command is determined. For example, the ME 340 analyzes the command(s) encoded in the execution task configuration file 800 to determine what component(s) is/are to trigger and/or execute the command. For example, a command can be identified by the ME 340 as a command to be executed by the MA 350 (and its vA 320) based on the command name 810, expected input 820, expected output 830, and/or component identifier 840 from the configuration file 800. A command can be identified by the ME 340 as a command to be triggered and/or otherwise executed by the remote host 720 based on the command name 810, expected input 820, expected output 830, and/or component identifier 840 from the configuration file 800, for example. The management endpoint 340 can determine which component(s) (e.g., management agent 350, remote host 720, etc.) are to trigger/execute a command by comparing the command name 810 to a list, set, or database of commands associated with system components/processing functionality, evaluating expected input(s) 820 and/or output(s) 830 associated with the command, examining the component identifier 840, extracting other definition from the configuration file 800 representing the execution task, etc.

If the command is to be executed/triggered by the MA 350, then the command (and associated information) is routed to the MA 350. At block 1210, the command is executed by the MA 350. For example, a logging command is executed by the MA 350 to collect logs from one or more associated component servers 330-336 at the MA 350. At block 1212, the MA 350 determines a status of the executed/executing command. For example, the MA 350 determines that command execution has been triggered, has been completed, is ongoing, has failed, was successful, was relayed to another component, etc. At block 1214, the execution status is relayed to the ME 340.

If the command is to be executed/triggered by the remote host 720, then the command (and associated information) is routed to the remote host 720. At block 1216, the command is executed by the remote host 720. For example, a password change command is executed by the remote host 720 to change a user and/or system password, a hypervisor configuration command is executed to configure the remote host 720 as a hypervisor, etc. At block 1218, the remote host 720 determines a status of the executed/executing command. For example, the remote host 720 determines that command execution has been triggered, has been completed, is ongoing, has failed, was successful, was relayed to another component, etc. At block 1220, the execution status is relayed to the ME 340.

Figure 13:
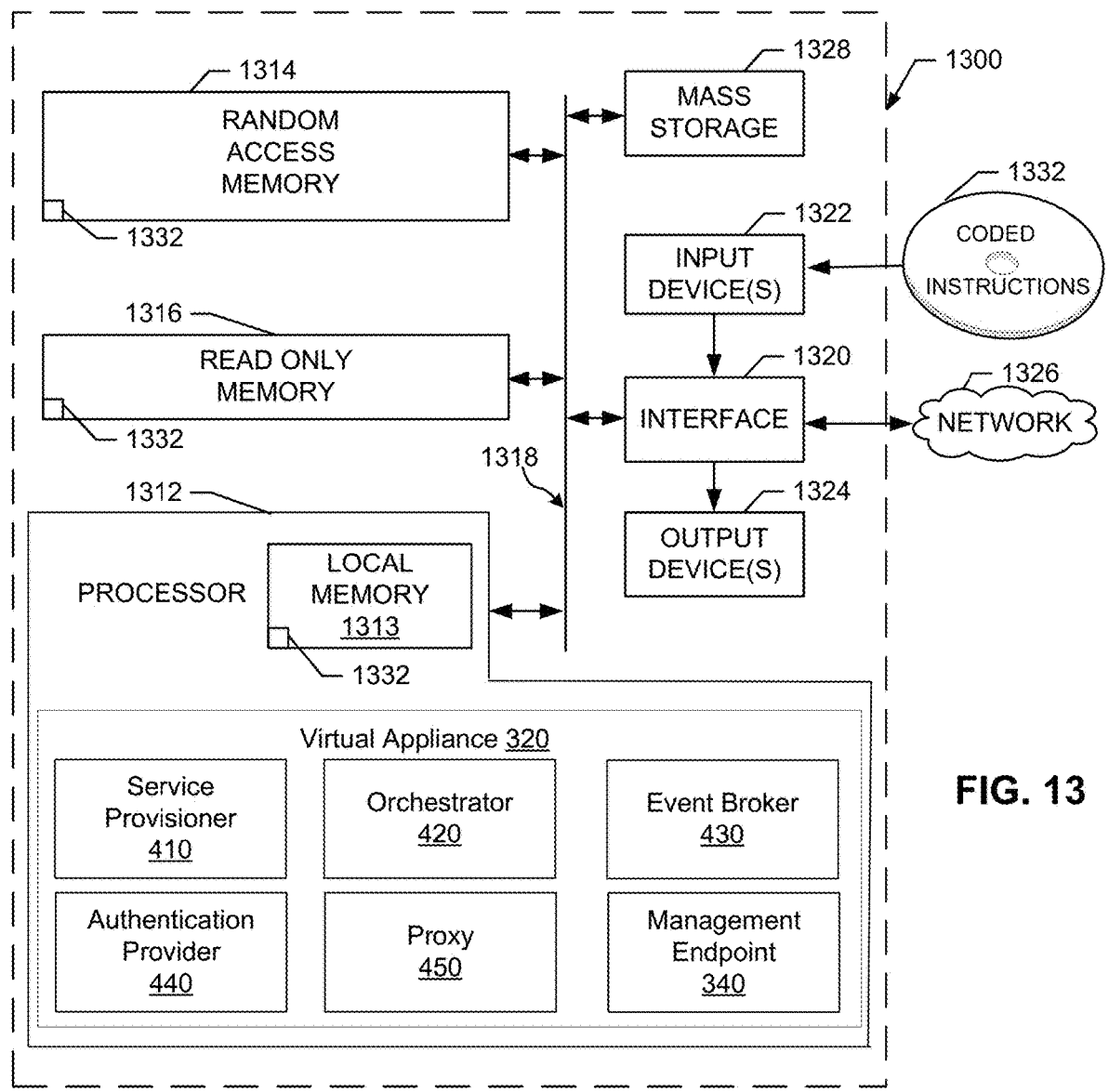
FIGS. 13-15 are block diagrams of an example processing platform capable of executing the example machine-readable instructions of FIGS. 10-12.

FIG. 13 is a block diagram of an example processor platform 1300 capable of executing the instructions of FIGS. 10-12 to implement the example systems, operation, and management of FIGS. 1-9 including at least the example vA 320. The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache), and executes instructions to implement the example systems 100, 300 or portions thereof, such as the vA 320-324 and associated management endpoint 340-344. The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include flash devices, floppy disk drives, hard drive disks, optical compact disk (CD) drives, optical Blu-ray disk drives, RAID systems, and optical digital versatile disk (DVD) drives.

Coded instructions 1332 representative of the example machine readable instructions of FIGS. 10-12 may be stored in the mass storage device 1328, in the volatile memory 1314, in the non-volatile memory 1316, and/or on a removable tangible computer readable storage medium such as a CD or DVD.

In certain examples, the processor 1312 can be used to implement the virtual appliance 320 (and vAs 322-324) and associated components including the component server 330 (and servers 332-336) and their components including the service provisioner 410, orchestrator 420, event broker 430, authentication provider 440, proxy 450, and management endpoint 340, etc.

Figure 14:
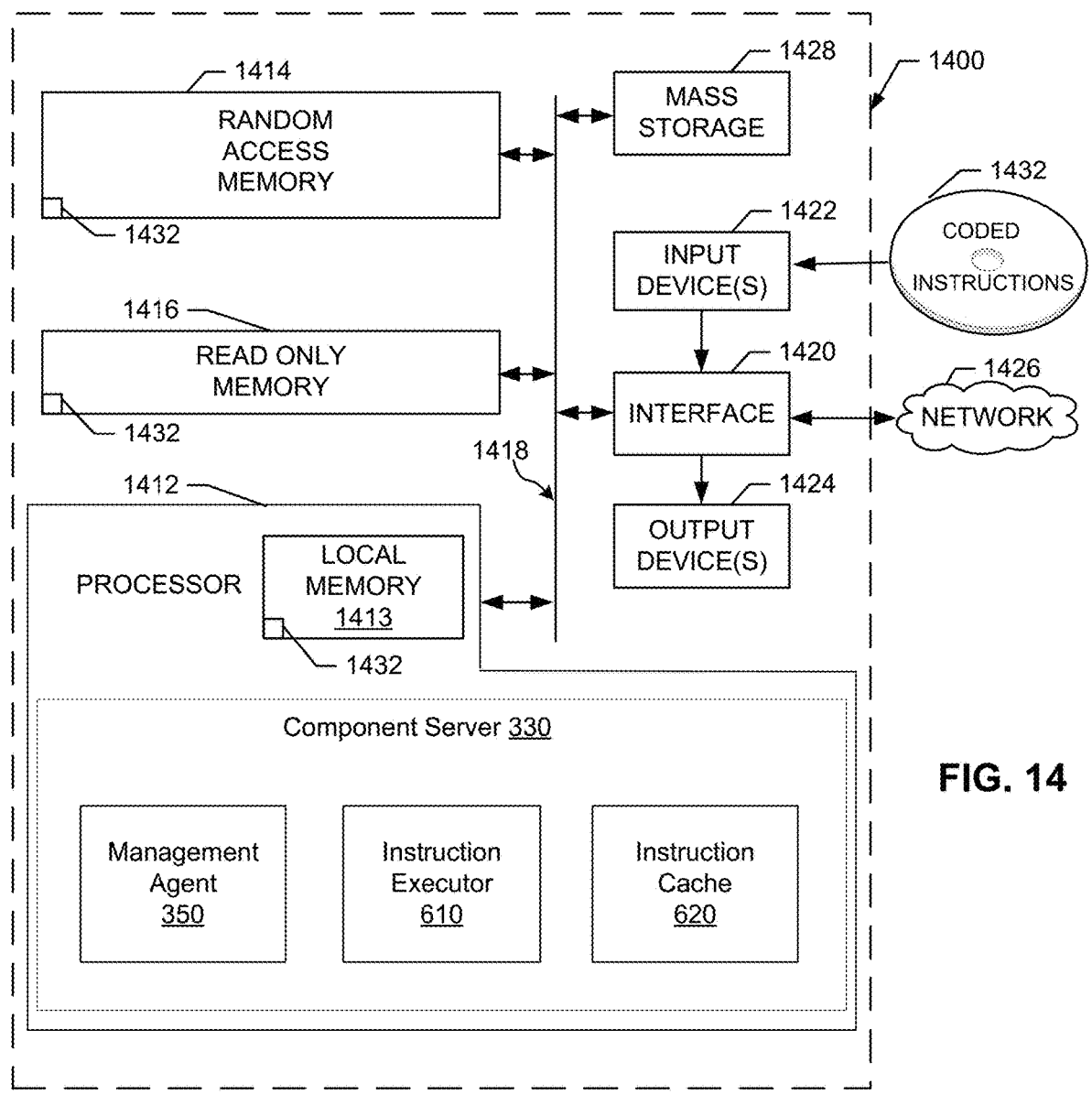

FIG. 14 is a block diagram of an example processor platform 1400 capable of executing the instructions of FIGS. 10-12 to implement the example systems, operation, and management of FIGS. 1-9 including at least the example component server 330. The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer.

The processor 1412 of the illustrated example includes a local memory 1413 (e.g., a cache), and executes instructions to implement the example systems 100, 300 or portions thereof, such as the component server 330-336 and associated management agent 350-356. The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include flash devices, floppy disk drives, hard drive disks, optical compact disk (CD) drives, optical Blu-ray disk drives, RAID systems, and optical digital versatile disk (DVD) drives.

Coded instructions 1432 representative of the example machine readable instructions of FIGS. 10-12 may be stored in the mass storage device 1428, in the volatile memory 1414, in the non-volatile memory 1416, and/or on a removable tangible computer readable storage medium such as a CD or DVD.

In certain examples, the processor 1412 can be used to implement the virtual appliance 320 (and vAs 322-324) and included components such as the management agent 350, instruction executor 610, instruction cache 620, etc.

Figure 15:
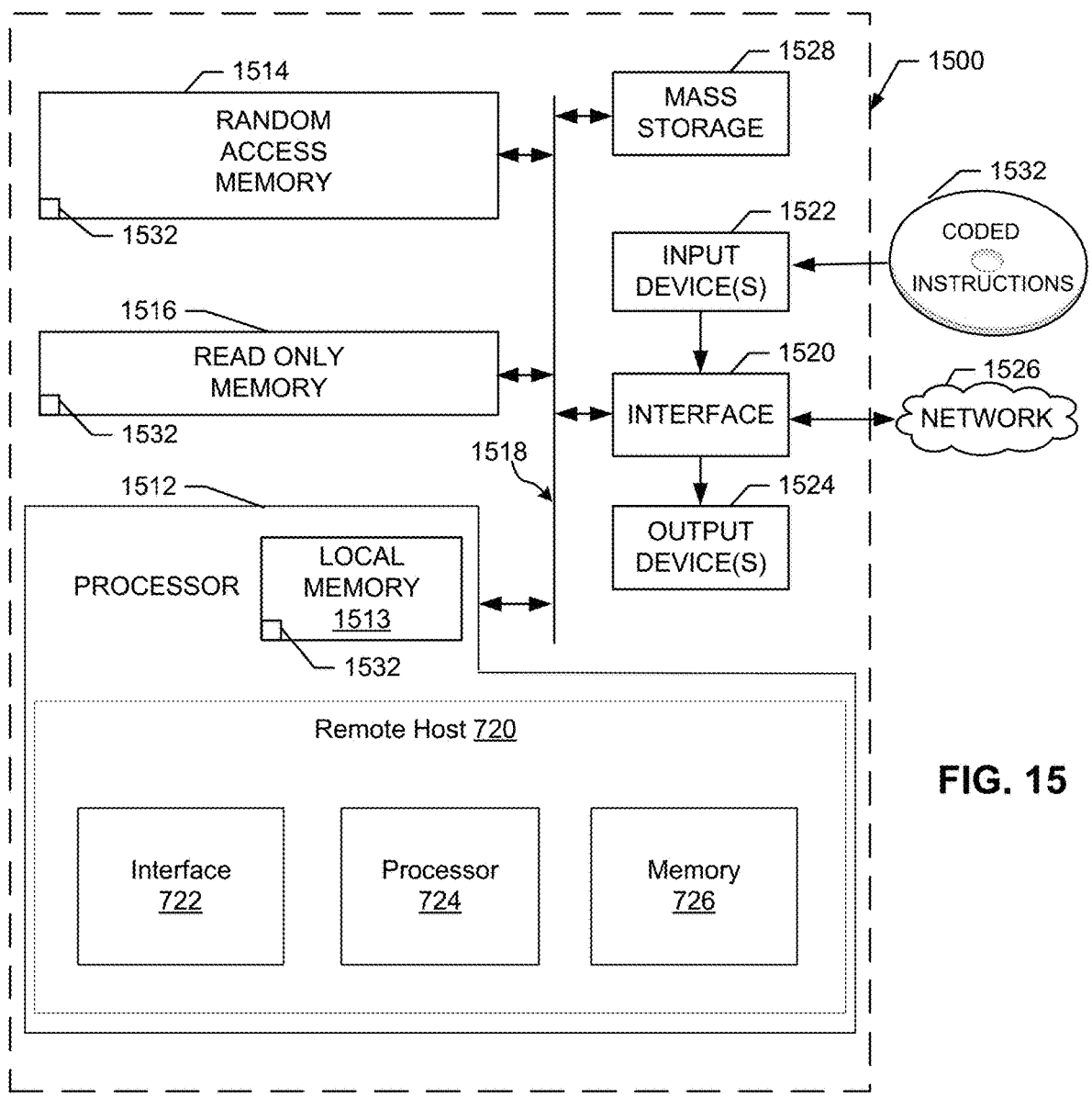

FIG. 15 is a block diagram of an example processor platform 1500 capable of executing the instructions of FIGS. 10-12 to implement the example systems, operation, and management of FIGS. 1-9 including at least the example remote host 720. The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer.

The processor 1512 of the illustrated example includes a local memory 1513 (e.g., a cache), and executes instructions to implement the example systems 100, 300 or portions thereof, such as the remote host 720. The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, an audio sensor, a microphone, a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.).

The processor platform 1500 of the illustrated example also includes one or more mass storage devices 1528 for storing software and/or data. Examples of such mass storage devices 1528 include flash devices, floppy disk drives, hard drive disks, optical compact disk (CD) drives, optical Blu-ray disk drives, RAID systems, and optical digital versatile disk (DVD) drives.

Coded instructions 1532 representative of the example machine readable instructions of FIGS. 10-12 may be stored in the mass storage device 1528, in the volatile memory 1514, in the non-volatile memory 1516, and/or on a removable tangible computer readable storage medium such as a CD or DVD.

In certain examples, the processor 1512 can be used to implement the remote host 720 and included components such as the interface 722, processor 724, memory 726, etc.

From the foregoing, it will be appreciated that the above disclosed methods, apparatus and articles of manufacture facilitate installation of a virtual appliance and associated component servers as an IaaS in a distributed environment such as a cloud computing environment and management of agents in the distributed environment. Examples disclosed herein facilitate self-evaluation and installation of servers and agents without further user intervention or cloud oversight.

As described above, rather than exposing internal functionality of a cloud computing platform or permitting secure shell access to the platform, certain examples facilitate execution of computing platform functionality via an API and associated configuration files. The configuration files represent commands and allow a requester to trigger execution of such commands via the API. Configuration information, status information, etc., can be returned for a triggered command via the API. Thus, external actors can request component functionality in the cloud computing platform without having full access to the platform itself. Certain examples expose specific internal functionalities (even some that were not designed to be available externally) via the API and allow the platform to control which parts of a command are being exposed. Certain examples allow execution of commands without providing root access to the internal computing infrastructure.

Certain examples include an apparatus including a first virtual appliance including a management endpoint to coordinate task execution in a computing platform and a computing infrastructure interface including a programming interface. The example programming interface is to expose a subset of commands for the computing platform and to hide a remainder of the commands of the computing platform from a requester. The example requester is to execute a first command from the subset of commands via the programming interface. The example management endpoint is to parse a first execution task generated from selection of the first command via the programming interface to determine a component of the computing platform to execute the first command associated with the first execution task and to route the first command from the first execution task to the component for execution.

Certain examples include a computer readable storage medium including instructions that, when executed, cause a machine to at least receive a programming interface trigger for first execution task associated with a first command at a management endpoint, the programming interface to expose a subset of commands for a computing platform and to hide a remainder of the commands of the computing platform from a requester, the requester to execute the first command from the subset of commands via the programming interface. The example instructions, when executed, also cause the machine to at least parse, using the management endpoint, the first execution task to determine a component of the computing platform to execute the first command associated with the first execution task. The example instructions, when executed, also cause the machine to at least route the first command from the first execution task to the component for execution.

Certain examples include a method including receiving, at a management endpoint, a programming interface trigger for first execution task associated with a first command, the programming interface to expose a subset of commands for a computing platform and to hide a remainder of the commands of the computing platform from a requester, the requester to execute the first command from the subset of commands via the programming interface. The example method includes parsing, using the management endpoint, the first execution task to determine a component of the computing platform to execute the first command associated with the first execution task. The example method includes routing the first command from the first execution task to the component for execution.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a virtual appliance including a management endpoint to coordinate task execution in a computing platform;
a computing infrastructure interface including a programming interface, the programming interface to expose a first subset of commands of the computing platform and to hide a second subset of the commands of the computing platform from a requester, a first command from the first subset of commands to be executable by the requester via the programming interface, the first command associated with a configuration file defining an execution task for the first command,
wherein the management endpoint is to:
parse the execution task to identify instructions to execute for the first command and to determine a component of the computing platform to execute the instructions; and
route the instructions to the component for execution.

2. The apparatus of claim 1, wherein the management endpoint is to assign an execution identifier to the execution task, the management endpoint to provide the execution identifier via the programming interface.

3. The apparatus of claim 2, wherein the management endpoint is to generate an execution status based on information from the component executing the first command, the management endpoint to provide the execution status via the programming interface.

4. The apparatus of claim 1, wherein the component includes at least one of a management agent or a remote host.

5. The apparatus of claim 4, wherein the management agent is associated with a component server.

6. The apparatus of claim 1, wherein the programming interface includes at least one of an instruction execution application programming interface and a status retrieval application programming interface.

7. The apparatus of claim 1, wherein the configuration file is to allow the first command to be accessed via the programming interface and to mask the instructions to be executed internally to implement the first command on the computing platform.

8. The apparatus of claim 7, wherein the configuration file includes a command name and at least one expected input for the command.

9. The apparatus of claim 8, wherein the configuration file further includes a component identifier identifying the component to execute the first command.

10. A tangible computer readable storage medium comprising instructions that, when executed, cause a machine to at least:
parse, at a management endpoint, an execution task to identify instructions to execute for a first command corresponding to the execution task and to determine a component of a computing platform to execute the instructions, the execution task defined in a configuration file exposed for selection via a programming interface, the programming interface to expose a first subset of commands of the computing platform and to hide a second subset of the commands of the computing platform from a requester; and
route the instructions to the component for execution.

11. The computer readable storage medium of claim 10, wherein the instructions, when executed, further cause the machine to assign an execution identifier to the first execution task, the management endpoint to provide the execution identifier via the programming interface.

12. The computer readable storage medium of claim 11, wherein the instructions, when executed, further cause the machine to generate an execution status based on information from the component executing the first command, the management endpoint to provide the execution status via the programming interface.

13. The computer readable storage medium of claim 10, wherein the component includes at least one of a management agent or a remote host.

14. The computer readable storage medium of claim 13, wherein the management agent is associated with a component server.

15. The computer readable storage medium of claim 10, wherein the programming interface includes at least one of an instruction execution application programming interface and a status retrieval application programming interface.

16. The computer readable storage medium of claim 10, wherein the configuration file is to allow the first command to be accessed via the programming interface and to mask the instructions to be executed internally to implement the first command on the computing platform.

17. The computer readable storage medium of claim 16, wherein the configuration file includes a command name and at least one expected input for the command.

18. The computer readable storage medium of claim 17, wherein the configuration file further includes a component identifier identifying the component to execute the first command.

19. A method comprising:
parsing, using a management endpoint, an execution task to identify instructions to execute for a first command corresponding to the execution task and to determine a component of a computing platform to execute the instructions, the execution task defined in a configuration file exposed for selection via a programming interface, the programming interface to expose a first subset of commands of the computing platform and to hide a second subset of the commands of the computing platform from a requester as defined in at least one configuration file associated with the programming interface; and
routing the instructions to the component for execution.

20. The method of claim 19, wherein the first execution task is assigned an execution identifier and an execution status.

* * * * *